United States Patent
Tiwari et al.

(10) Patent No.: US 11,057,558 B2
(45) Date of Patent: Jul. 6, 2021

(54) USING CHANGE OF SCENE TO TRIGGER AUTOMATIC IMAGE CAPTURE

(71) Applicant: MICROSOFT TECHNOLOGY LICENSING, LLC, Redmond, WA (US)

(72) Inventors: Onkar Nath Tiwari, Hyderabad (IN); Abhishek Agarwal, Hyderabad (IN); Rahul Bhuptani, Hyderabad (IN); Mahesh Sridharan, Hyderabad (IN); Sachin Talreja, Hyderabad (IN); Anish Chandran, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 7 days.

(21) Appl. No.: 16/234,473

(22) Filed: Dec. 27, 2018

(65) Prior Publication Data
US 2020/0213509 A1 Jul. 2, 2020

(51) Int. Cl.
*H04N 5/232* (2006.01)
*G06K 9/62* (2006.01)

(52) U.S. Cl.
CPC ....... *H04N 5/23222* (2013.01); *G06K 9/6212* (2013.01); *G06K 9/6215* (2013.01)

(58) Field of Classification Search
CPC . H04N 5/23222; G06K 9/6215; G06K 9/6212
See application file for complete search history.

(56) References Cited

U.S. PATENT DOCUMENTS

| | | | |
|---|---|---|---|
| 5,959,622 A | 9/1999 | Greer et al. | |
| 7,594,609 B2 | 9/2009 | Kotlarsky et al. | |
| 9,516,227 B2 | 12/2016 | Chau et al. | |
| 9,578,195 B1 | 2/2017 | Pashintsev et al. | |
| 2003/0058364 A1 | 3/2003 | Kuo et al. | |
| 2004/0175042 A1 | 9/2004 | Kroeker et al. | |
| 2006/0125928 A1 | 6/2006 | Wolcott et al. | |
| 2009/0273704 A1* | 11/2009 | Pincenti | H04N 5/23212 348/349 |
| 2015/0054975 A1 | 2/2015 | Emmett et al. | |

FOREIGN PATENT DOCUMENTS

WO 2009134627 A2 11/2009

OTHER PUBLICATIONS

Dong, et al., "Automatic image capturing and processing for PetrolWatch", In Proceedings of the 17th IEEE International Conference on Networks, Dec. 14, 2011, pp. 236-240.

(Continued)

*Primary Examiner* — Twyler L Haskins
*Assistant Examiner* — Angel L Garces-Rivera
(74) *Attorney, Agent, or Firm* — NovoTechIP International PLLC

(57) ABSTRACT

A series of frames or live images received by a camera can be processed by an automatic image capture system to determine when an automatic image capture should take place. The system can detect when a scene change occurs by comparison of data for two or more frames. If a scene change is followed by a stabilization of the scene, the system can trigger an auto-capture of the stabilized scene, without the need for user input.

16 Claims, 18 Drawing Sheets

(56) References Cited

OTHER PUBLICATIONS

"International Search Report and Written Opinion Issued in PCT Application No. PCT/US2019/067704", dated Apr. 28, 2020, 13 Pages.

Yoon, et al., Scene Change Detection Using a Local Detection Tree and Clustering in Ubiquitous Environment, In Proceedings of International Conference on Computational Science and Its Applications, Jun. 30, 2008, pp. 381-389.

* cited by examiner

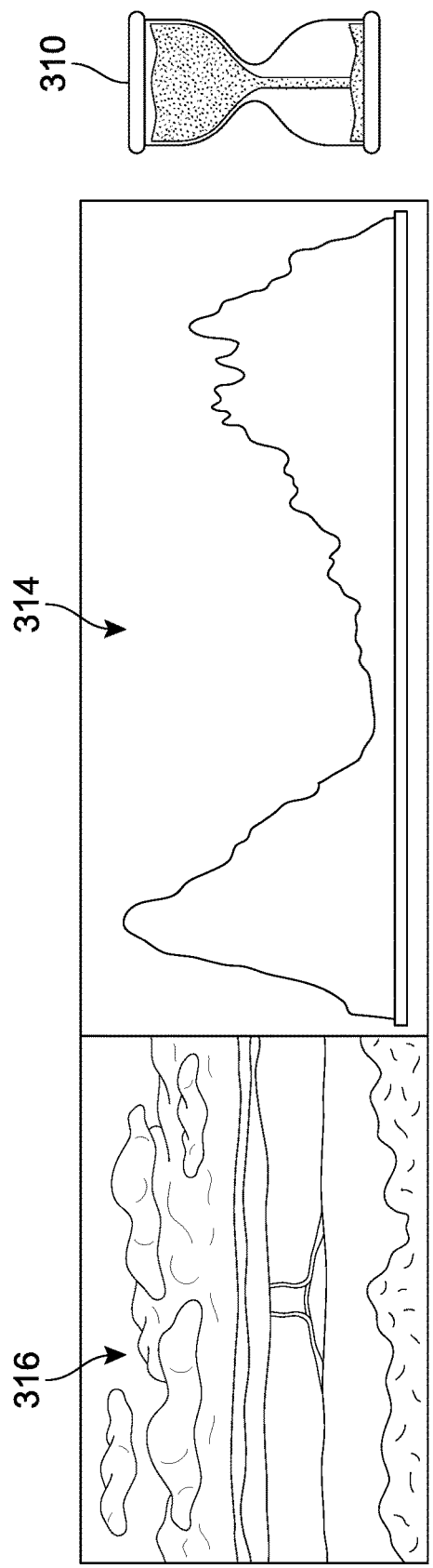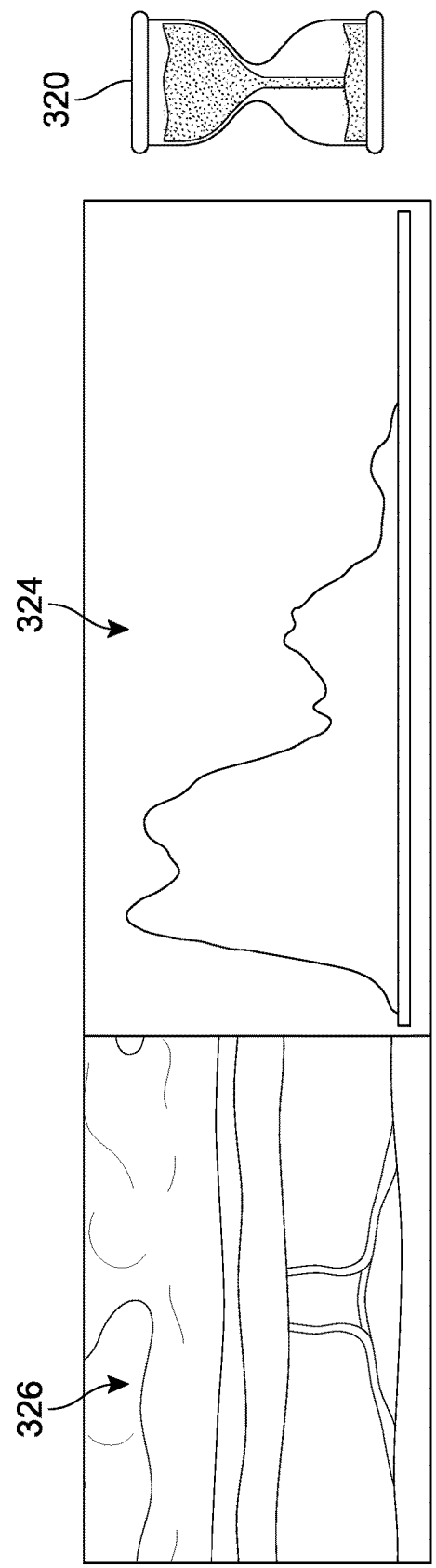
FIG. 4A
FIG. 4B

US 11,057,558 B2

USING CHANGE OF SCENE TO TRIGGER AUTOMATIC IMAGE CAPTURE

BACKGROUND

Computing devices that include cameras have become increasingly common and mobile, and include devices such as laptop computers, tablet PCs, digital camera devices, mobile phones, ultra-mobile PCs, as well as other mobile data, messaging, and/or communication devices. Users may make use of cameras associated with computing devices to take various pictures of scenery as well as capture images of presentations, whiteboards, business cards, documents, sketches, paintings, and so forth. The users can then refer to the captured images to recall information contained therein such as diagrams, pictures, lists and other text, and so forth. In many cases, users intend to make use of information from captured images in their own documents, notes, and/or presentations.

A traditional technique utilized to capture images involves the use of photo applications that rely on user input to capture a scene. In other words, the user must launch the camera and/or application, point at the desired scene, and click to capture the image. Unfortunately, operating the phone single handed and clicking the photo to achieve a stable, clean photo while maintaining focus on the desired object on the screen remains challenging. In addition, arranging for a hands-free operation of a phone camera has been difficult to achieve. Thus, there remain significant areas for new and improved ideas for the efficient capture of digital content with minimal user effort.

SUMMARY

A system, in accordance with a first aspect of this disclosure, includes at least one processor and one or more computer readable media. The computer readable media include instructions which, when executed by the at least one processor, cause the at least one processor to receive, at a first time, a first image corresponding to a first real-world scene, as well as receive, at a second time subsequent to the first time, a second image corresponding to a second real-world scene. In addition, the instructions cause the at least one processor to determine that the first image differs by at least a first amount from the second image, and to receive, at a third time subsequent to the second time, a third image corresponding to a third real-world scene. Furthermore, the instructions cause the at least one processor to determine that the second image and the third image are substantially similar, and to automatically capture, in response to determining the second image and third image are substantially similar, at least a first region of the third image via a camera optical system.

A method, in accordance with a second aspect of this disclosure, includes receiving, at a first time, a first image corresponding to a first real-world scene, as well as receiving, at a second time subsequent to the first time, a second image corresponding to a second real-world scene. The method further includes determining that the first image differs by at least a first amount from the second image, and receiving, at a third time subsequent to the second time, a third image corresponding to a third real-world scene. In addition, the method includes determining that the second image and the third image are substantially similar, and then automatically capturing, in response to determining the second image and third image are substantially similar, at least a first region of the third image via a camera optical system.

A system, in accordance with a third aspect of this disclosure, includes at least one processor and one or more computer readable media. The computer readable media include instructions which, when executed by the at least one processor, cause the at least one processor to receive, via a camera, a plurality of images frames including a first image frame and a subsequent second image frame, as well as determine a scene change has occurred between the first image frame and the second image frame. The instructions cause the at least one processor to receive, via the camera, a third image frame subsequent to receiving the second image frame, and determine a scene stabilization has occurred between the second image frame and the third image frame. Furthermore, the instructions cause the at least one processor to initiate an auto-capture of a fourth image frame received after the third image frame based at least on the determinations that the scene change occurred and the scene stabilization occurred.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 4A and 4B are examples of histograms for the two images of FIGS. 3A and 3B;

DETAILED DESCRIPTION

Figure 1A:
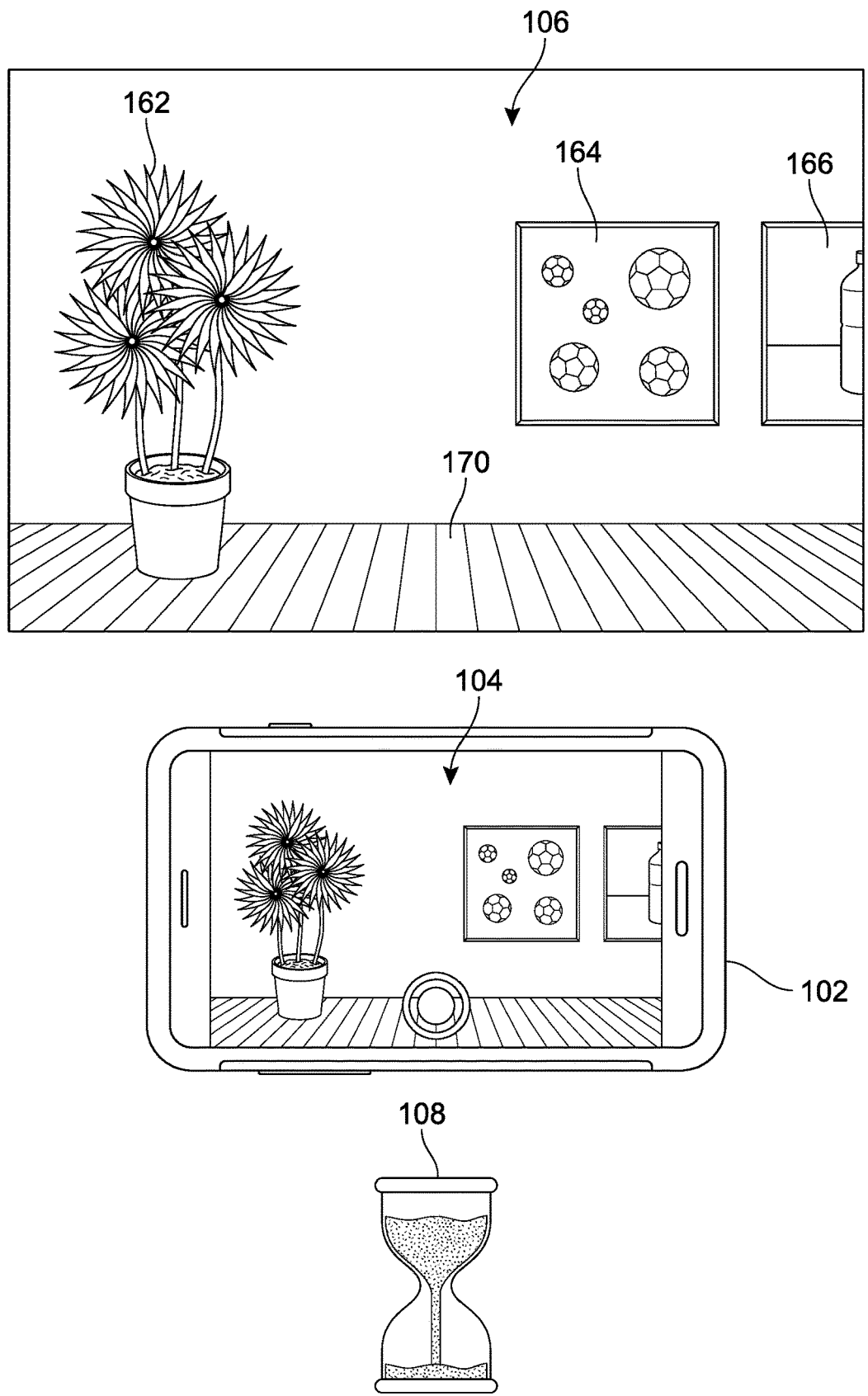
FIGS. 1A-1C each illustrate an implementation of an image capture application and environment.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following implementations introduce an image capture application toolbox for facilitating camera operations for users. The proposed systems provide users with a more intuitive and less cumbersome experience by an automatic image capture process triggered by detection of scene changes and subsequent scene stabilization. In some implementations, the systems can be configured to receive a series of images or frames and compare a recently received image with a previously received image to determine whether a scene change has occurred or is occurring. Traditionally, image capture workflow has included a series of steps where a user can: (1) point a camera at a real-world scene; (2) steady and wait to focus the camera; (3) provide an input that triggers the capture; (4) capture the photo; and (5) repeat these steps as needed to take multiple photographs. Thus, in order to ensure the desired scenes are captured, beyond pointing the camera to orient the lens toward the scene, a user must provide a follow-up input that confirms that this scene should be captured. In many cases, this follow-up input can lead to a destabilization of the camera, a change in the focus of the camera, blurriness in the image, or a delay that means the specific scenery is missed or no longer framed correctly. In addition, the need for user input means the user cannot turn away from the camera or become involved in any other activity in order to ensure the image is captured. Furthermore, in cases where there are multiple images to be captured of various scenes, the process can become repetitive, time-consuming, and tiresome to a user. The disclosed implementations allow a user to activate an auto-capture mode where they may point or otherwise orient a camera toward one or more real-world scenes and, without further user input, automatically capture photos of said scenes. In some implementations, the system will be triggered when a determination is made that the scene differs from a previously viewed or captured scene and that this scene is stable for a pre-defined period of time, as determined heuristically by the system. As some examples, this period can be between 40 ms and 500 ms. In some implementations, the period can be approximately between 100 ms and 200 ms. In one implementation, the period can be set as 150 ms. Such a system can offer users the ability to capture images without requiring repetitive input and, in some implementations, offer an auto-capture mode that permits users to engage in other activities during the image capture without loss of image quality or timing.

As introduced above, various applications can be used to receive, capture and/or present digital images or electronic content. For purposes of this description, the term "electronic content" or "image" includes any digital data that may be visually represented, including but not limited to an electronic document, a media stream, real-time video capture, real-time image display, a document, web pages, a hypertext document, any image, digital video or a video recording, animation, and other digital data. As an example, this electronic content may include images captured by photography applications, or other software configured to provide users with tools for use with digital images.

Furthermore, within some types of documents, the electronic content can be understood to include or be segmented into one or more units that will be referred to as image content regions ("content regions"), or more simply, regions. For purposes of this application, the term "region" describes portions of digital content that are identifiable and/or selectable as distinct or discrete segments of an image. As an example, one collection of electronic content (such as a digital photograph) can be characterized as or by a plurality of regions that may each include one or more image content portions ("content portions"). In different implementations, a first image content region may overlap with a portion of another, second image content region in the same image. Thus, a content region includes any part of an electronic content that may be defined or discernable by the system. For example, a content region may be automatically discerned from a characteristic of the content portion itself or relative to other content portions (e.g., a color, luminosity level, an edge detection, shape, symbol, pixel), or may be manually defined by a reviewer or end-user (e.g., selected set of pixels or object), or any other selected portion of a digital image.

Furthermore, an end-user (or "user") for purposes of this application is one who captures, edits, views, manages, or deletes pieces of electronic content, including the creation, viewing, or updating of selected regions in the electronic content. An end-user includes a user of application programs, as well as the apparatus and systems described herein. Furthermore, for purpose of this description, the term "software application", "software", or "application" refers to a computer program that performs useful work, generally unrelated to the computer itself. Some non-limiting examples of software applications include photography software, image capture/editing applications, word processors, spreadsheets, slideshows, presentation design applications, accounting systems, and telecommunication programs, as well as gaming software, utility and productivity tools, mobile applications, presentation graphics, and other productivity software.

The software application that may incorporate the disclosed features can be installed on a client's device, or be associated with a third-party application, such as a web-browser application that is configured to communicate with the device. These devices can include, for example, desktop computers, mobile computers, mobile communications devices (such as mobile phones, smart phones, tablets, etc.), smart televisions, gaming devices, set-top boxes, and/or any other computing devices that include a camera and/or an image-display capability. Generally, such applications permit end-users to capture or scan documents, presentations, real-world objects, and other subjects using images received by a camera or images stored or accessed from memory. Furthermore, in some implementations, camera-based scanning applications can be configured to correct for the effects of perspective on rectangular or other polygonal objects such as paper, business cards, whiteboards, screens, and so forth.

For purposes of simplicity, the following implementations discuss the use of the system within the context of mobile computing devices, such as mobile phones and tablets. However, any electronic device with a camera may benefit from the use of these systems. These devices can provide users with several input mechanisms, including a home button, a power button, a mode button, and/or a camera shutter (image-capture) button, which may be installed as hardware, or available via a touchscreen display which can display a touchscreen camera shutter button. In some cases, a user may opt to use the touchscreen camera shutter button rather than a mechanical camera shutter button. The camera shutter button of a mobile device can in some cases be equipped with the ability to detect "half-press" and "full-press" as distinct, separate actions. For example, a half-press refers to the partial actuation of a button or other control, while a full-press refers to a further actuation of the button or control past a determined limit. In some examples, the device can include a dual-action camera shutter button that can detect a half-press (where input data is received with the mobile device that is associated with auto-focus functionality) and also detect a full-press (where input data is received that is associated with camera invocation and image capture). In addition, some devices may include one or both of a frontward-facing lens and a rearward-facing lens, as well as a microphone.

In cases where the input mechanism is provided via a touch screen display, additional options can also be used to control a subset of the image-capture functionality. In different implementations, such controls can include a still image capture mode button, a video capture mode button, an automatic image capture mode button, zoom-in and zoom-out controls, and an options or settings control. As will be described in further detail below, an automatic image capture mode button can be implemented as a toggle switch to enter and exit the auto-capture mode. In other words, once the auto-capture mode is on, pressing the mode button again would constitute an override of the auto-capture function. In one implementation, auto-capture mode can be deactivated through other mechanisms as well, such as activation of the camera shutter button. Some implementations of the automatic image capture system can be used in either still image capture mode or video capture mode It may be appreciated that the use of an electronic shutter is one aspect in which a digital electronic camera in a mobile device typically differs from a conventional, stand-alone, digital camera. Electronic shutters tend to have a long "shutter-lag time" between when the user activates image capture and when the image is actually captured. Like a slow shutter speed, a long lag time can cause reduced image quality due to blur from vibration of the camera during image capture. Another difference between a digital electronic camera in a mobile device and stand-alone digital cameras is that the lens aperture is typically smaller in a camera used with a mobile device. As a result, less light enters the lens, necessitating the use of a slower shutter speed to compensate for the small aperture size.

In the case of conventional, SLR (single lens reflex) or point-and-shoot digital cameras, a tripod can be used in low light conditions to stabilize the camera body and prevent vibrations from degrading the sharpness of the image. However, use of a tripod requires preparation, which is inconvenient, and therefore tripods are generally not a feasible solution for camera-phone photography. Consequently, camera-phones are typically not equipped with a tripod screw, or other mounting hardware, thus precluding attachment of a tripod or other stabilizing structure to overcome image quality disadvantages inherent in the construction of cameras that are integrated with mobile devices. However, these types of drawbacks can be readily mitigated by the use of an auto-capture system, as will be described herein.

The following implementations are configured to provide users with the ability to capture images with a camera without manual direction or input. Such an application enables users to capture one or multiple images using the device of their choice without the delay or motion associated with manual user inputs. In different implementations, a user may wish to capture a series of images over a period of time when a scene that is being viewed changes. Using this system, a user can aim a camera of a portable device towards a subject and initiate an ongoing automatic capture or recording process.

Figure 1B:
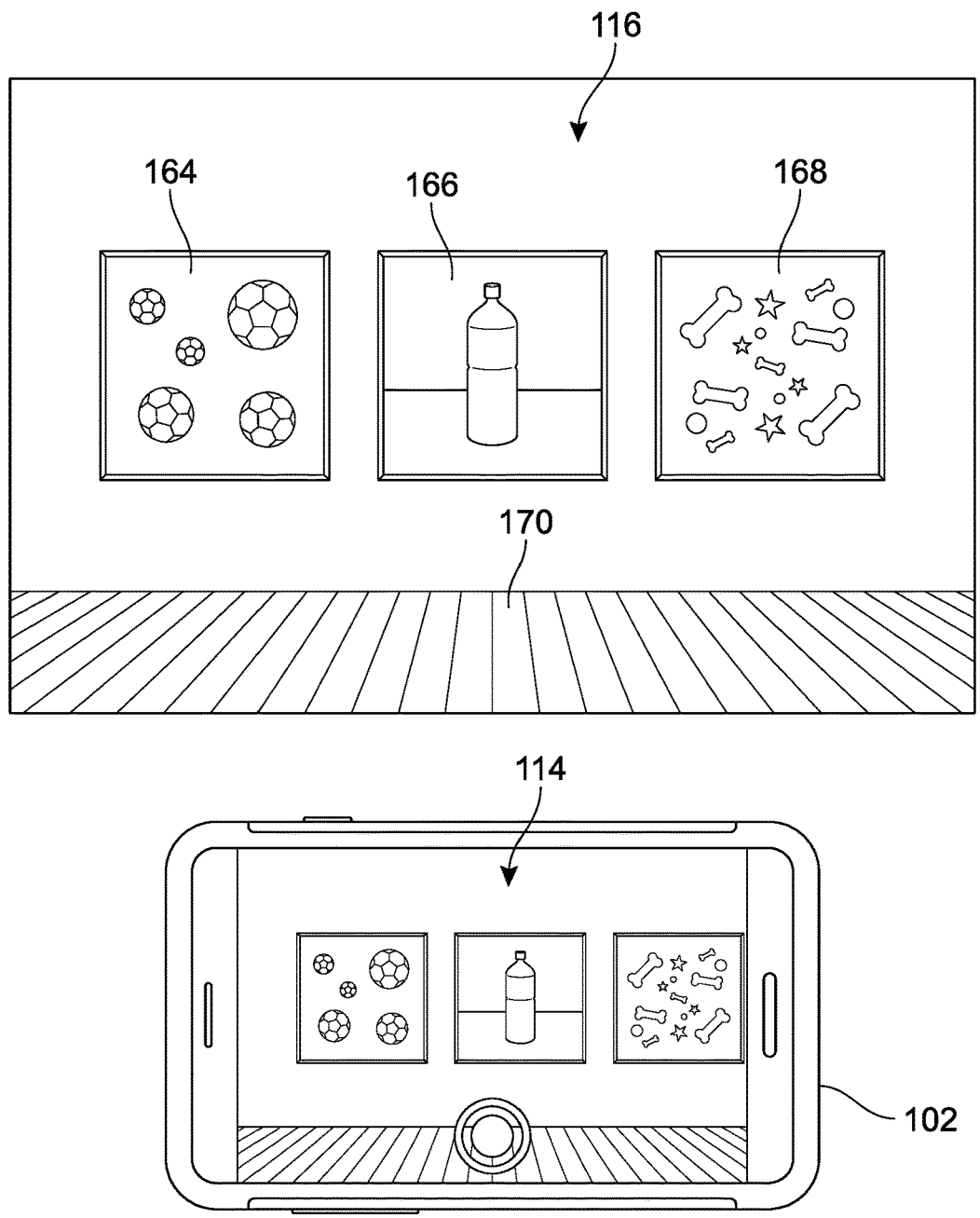
Figure 1C:
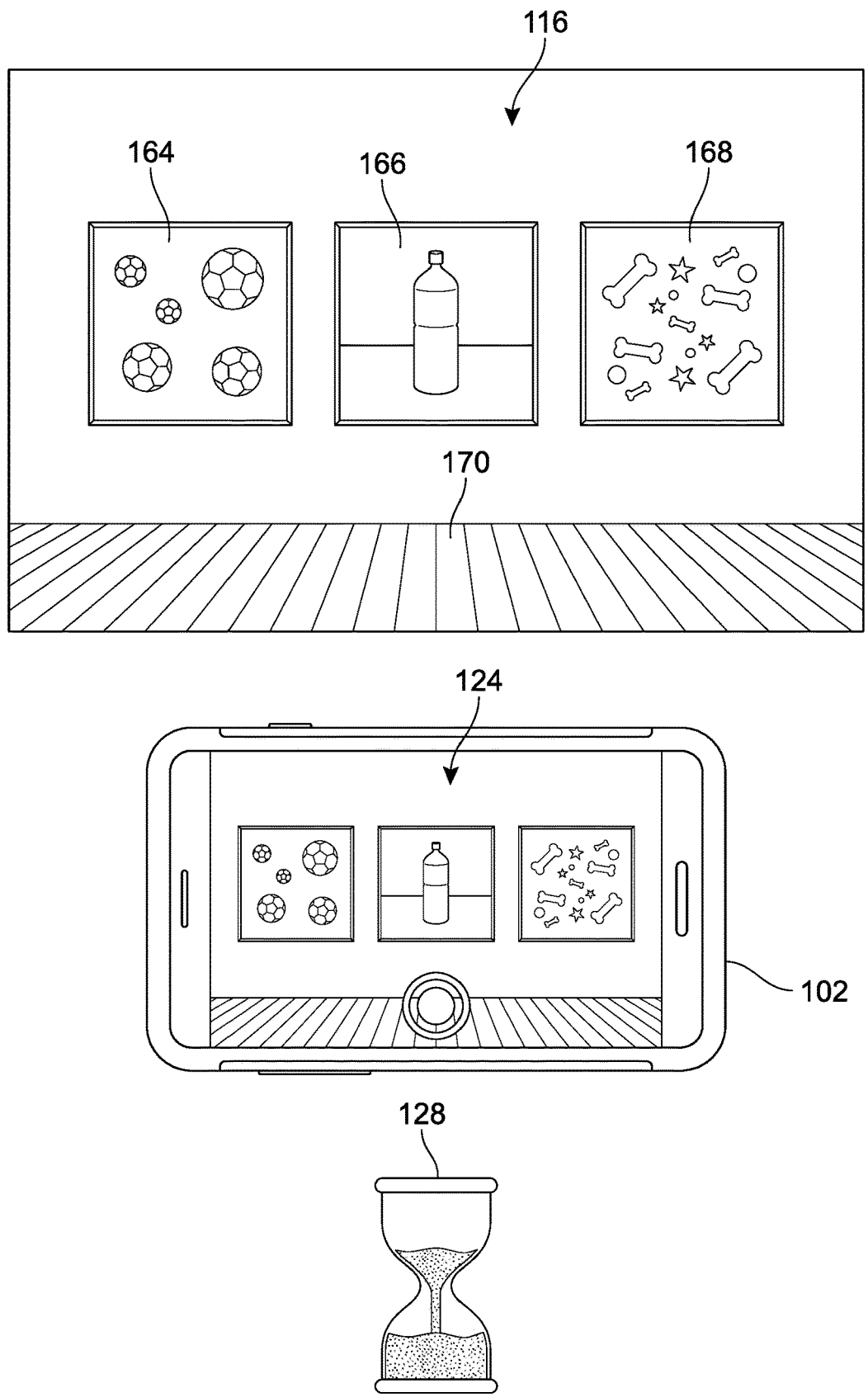
Figure 2:
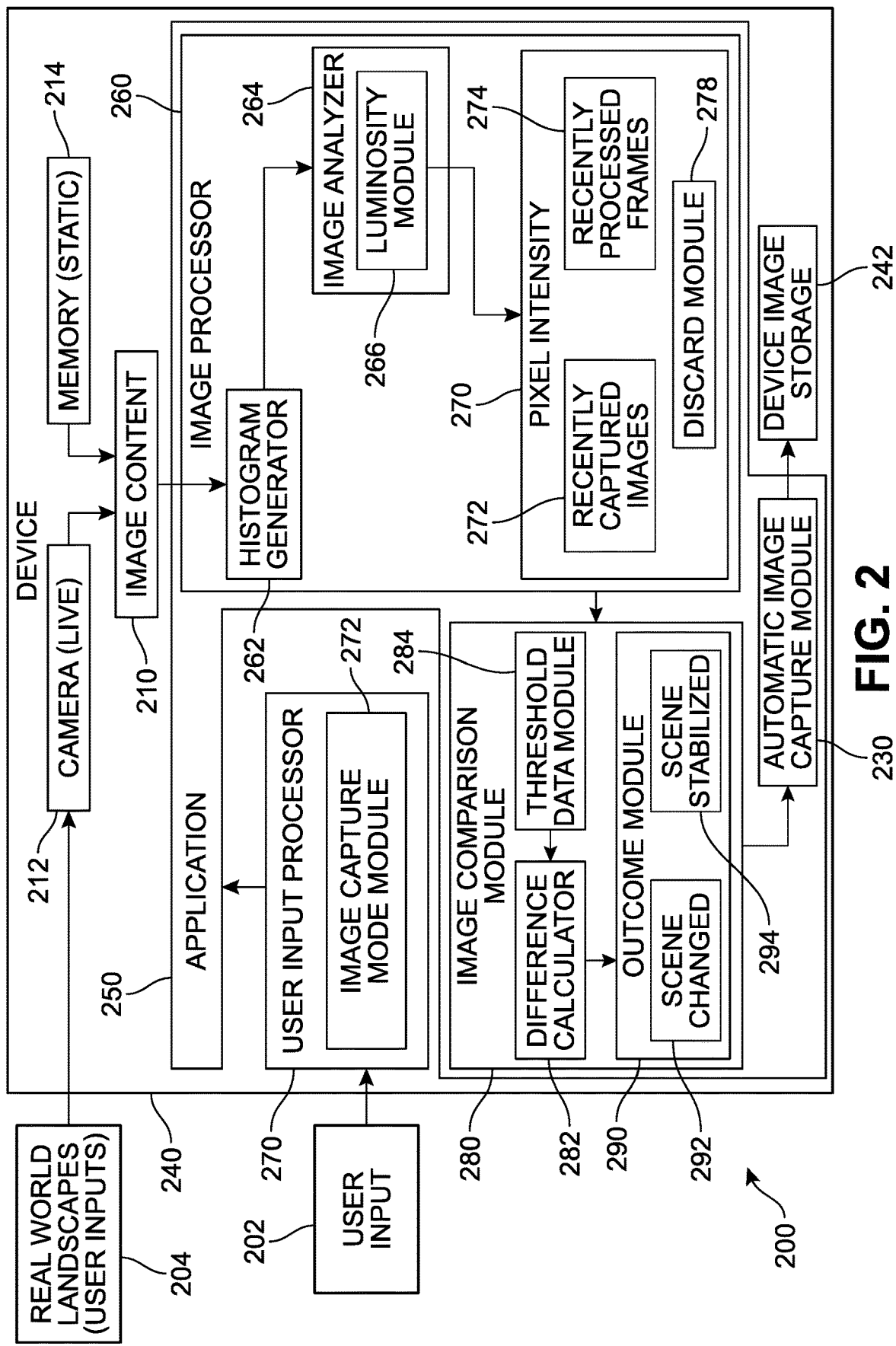
FIG. 2 is a conceptual diagram illustrating one implementation of a distributed computing environment for managing the capture of images.

In order to better introduce the systems and methods to the reader, FIGS. 1A-1C present an example of a representative image capture environment for implementing an automatic image capture system (the system is illustrated schematically in greater detail in FIG. 2). In different implementations, the environment can include one or more computing device end-users, or simply "users" who can capture, view, edit, and/or modify the image (for example a first user, a second user, a third user, etc.). One or more users can interact with or manipulate the image presented via a user device. As users view an electronic content such as an image, various regions of the image may be detected or the image may be otherwise identified for potential capture. In many cases, users are presented with a "live preview" of the real-world landscape as it is being viewed through the camera.

In FIG. 1A, a first computing device ("first device") 102 is shown in the process of receiving a first image preview 104 from a first real-world scene ("first scene") 106 at a first time 108. In addition, FIG. 1B shows the first device 102 in the process of receiving a second image preview 114 from a second real-world scene ("second scene") 116 at a second time 118, and FIG. 1C shows the first device 102 in the process of receiving a third image preview 124 from the second real-world scene 116 at a third time 128. Each preview is shown via a device touch-screen display that also functions as a user interface.

For purposes of simplicity, each of the first scene 106, second scene 116, and the third scene 126 can be understood to depict a portion of an art gallery or museum. The first scene 106 and the second scene 116 include overlapping regions. In addition, the second scene 116 and third scene 126 are substantially similar in that they include the same main objects. As the camera lens associated with the device is oriented toward a real-world scene, a corresponding image can be previewed on a display 150 of the device.

In some but not all implementations, the display 150 can be configured to receive data from the camera associated with the first device 102 in a live preview and present the items or objects in the camera's field of view through an image capture or image scanning application. In one implementation, the application can provide or present a graphical user interface, in conjunction with the image preview, referred to herein as an image content viewing interface ("interface"). In some implementations, the interface can be presented 'full-screen' on the display 150 or on only a portion of the display 150 and/or the interface may be substantially transparent or translucent, such that interactions with the screen or image are received by the application while the image itself remains mostly visible without superimposition of additional interface graphics that would otherwise obstruct the view of the image. However, in other implementations, the image capture application can present a variety of graphical elements in association with, overlaid on, or adjacent to the image, such as a menu, settings, or other options.

Furthermore, the application can incorporate the functionality of the device 150 to implement camera-based capture techniques that are described herein. The interface here is illustrated as a viewfinder that can present current images received by the camera optical lens and/or switch to present a captured image (i.e., from memory) when a picture has been taken or is being accessed from storage. In addition, in some implementations, a user may be able to modify and/or select portions of a captured image through interaction with the viewfinder portion of the display 150.

In some other implementations, the interface can be configured to display or present various indicators to guide a user. For example, the interface may be configured to display or present a menu, symbols, or other actuatable options. Generally, the term "interface" should be understood to refer to a mechanism for communicating content through a client application to an application user. For example, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. Furthermore, an "actuation" or "actuation event" refers to an event (or specific sequence of events) associated with a particular input or use of an application via an interface, such as a finger tap, keyboard command, voice command, or mouse-click, which can trigger a change in the display or functioning of the application or device.

In FIG. 1A, the first image preview 106 shows a projection of various objects in the first scene 106, including a potted plant 162, a first painting 164, a portion of a second painting 166, as well as a floor 170. As the camera of the first device 102 pans across the art gallery between the first time 108 and the second time 118, the potted plant 162 is no longer in view, as represented by the second image preview 114 in FIG. 1B. Instead, the first painting 164, the entire second painting 166, and a third painting 168, as well as the floor 170, are being projected in the second image preview 114. As the camera continues to pan to the right between the second time 118 and third time 128, the three paintings become more centered in the preview, as shown in the third image preview 124. In other words, the image being shown remains substantially similar between the second time 118 and the third time 128.

During this process, implementations of the disclosed systems can be configured to detect changes in scene between, for example, the first time 108 and the subsequent second time 118. In addition, the system can recognize the stabilization of the scene between the second time 118 and the subsequent third time 128. Once this two-fold determination occurs, the system can trigger an automatic capture of the current image being received. This process can be repeated indefinitely, to allow for automatic capture of multiple images as the camera continues to be moved, or the scene is otherwise changed.

Referring now to FIG. 2, an example of a representative architecture of an automated image capture system ("system") 200 is depicted. In different implementations, the system 200 can be configured to present user interfaces for display of electronic content and indications of scene changes and stabilization. The system 200 can be further configured to continually update the repository of image data being analyzed as determinations of scene status and conditions are made. It is to be understood that the system 200 presented here is merely an example implementation, only some aspects are presented for purposes of clarity, and that a wide variety of other implementations are possible.

In FIG. 2, the system 200 includes a device 240. The device 240 can include any type of device capable of presenting image and/or image-related content, such as cameras, mobile phones, tablets, laptops, desktops, gaming devices, projectors, and other such devices, as discussed above. The device 240 can include a wide variety of hardware and software components. While an image capture application 250 is illustrated as being locally installed on the device 240 in this example, in other implementations, some or all aspects or features of the image capture application 250 may be accessed from another device or accessed from cloud storage computing services.

The image capture application 250 is configured to receive image content 210 via one or more components of the device 240 and/or via external sources. The image content 210 may have been previously captured or 'static'—accessed from a memory 214 (local, external, or cloud-based memory)—or can be 'live' and currently being viewed or captured in real-time via a camera 212 receiving external, real-world data 204. The image content 210 can be received by the image capture application 250 and conveyed to an image processor 260, which is configured to process the data of image content 210. In some implementations, as will be described below, the image processor 260 can receive the image content 210 and generate a histogram via a histogram generator module 262. In one example, the histogram can comprise or refer to any type of statistical method that is applied to the image content and can provide a numerical and/or graphical representation of the tonal distribution in a digital image. A histogram in this case can be configured to plot the number of pixels for each tonal value and allow an image analyzer 264 to review the entire tonal distribution of an image, and determine the pixel intensity values for each pixel in the image. Thus, the histogram generator 262 can produce not just image-based histograms, but data that can indicate the number of pixels in an image at each different intensity value found in that image. Because the exact output from the operation will depend on the implementation selected, the histogram may be a data file representing the histogram statistics and/or an actual graphical representation that may also be accessible to a user.

In some implementations, the image content can be processed in different color encoding systems that encode a color image or video taking human perception into account. In some cases, RGB color representation may be used. However, the use of YUV color encoding may be preferred as it is associated with a reduced bandwith for chrominance components, thereby typically enabling transmission errors or compression artifacts to be more efficiently masked by the human perception than using a "direct" RGB-representation. Thus, in one implementation, the system can include a YUV processing component that can convert the image (e.g., an RGB image) into an image comprising luminance (Y) and chrominance (U and V) components (where the UV color space encodes a color image using a bandwidth allocation scheme that takes into account the frequency dependence of human color perception). In other implementations, color values may be also or alternatively used.

Some or all of the histogram data for each image content can be received by an image analyzer 264, which can further process the statistical data and isolate or otherwise identify key values for the image. In one implementation, a luminosity module 266 can scan or review the data to determine the proportions of pixels in the image content that are linked to specific luminosity values. This data can be submitted to a pixel intensity data storage module 270, which can hold in memory the histogram and/or luminosity data for recently processed live preview frames 274, as well as the data for captured images 272. These data will be transmitted to and evaluated by an image comparison module 280. In some implementations, the data that is no longer relevant to the comparison process, and/or has been in storage for greater than a pre-established period of time, can be discarded via a determination made by a discard module 278.

In some implementations, the image comparison module 280 can be configured to compute correlation coefficients between two or more image content items. As illustrated in FIG. 2, the computed correlation coefficients can be compared with the values provided by decision thresholds stored in threshold data module 284. These thresholds can be established by the system, and/or can be customized by the user via a settings option. In different implementations, the system can be configured to detect changes in scene by comparison of a sequence of two or more images. The system, via difference calculator 282, can determine whether two images are similar (i.e., that the scene is stable or has not changed enough to warrant a decision that a scene change has occurred) or different (i.e., to the extent that a scene change may be considered to have occurred).

In some implementations, histogram "similarity" can be measured by computing the correlations between the histograms of the successive image frames. The transitions between scenes may be determined by comparing histogram correlations with empirically determined decision thresholds for three color spaces (e.g., YUV). For any two successive frames, if all three correlation coefficients are lower than the decision thresholds, a scene change may be identified. Otherwise, the two successive frames are assigned a "same scene" or "stable scene" classification. In another implementation, the decision may be based on only one or two of the three color spaces. In other words, the histogram data size may be reduced or minimized by isolation and use of Y color space values. In such cases, the use of device resources, including storage and processing, can be reduced, while providing substantially similar results to the cases where the determination is based on data from multiple color channels. Because the image comparison module 280 can evaluate the similarities of color and intensity histograms (e.g., histograms of YUV channels) of successive frames in the inputted image content based on only one color channel, the process as a whole becomes less onerous in its implementations and requirements. In some implementations, the difference calculator 282 can compare histogram correlations with empirically determined decision thresholds for only one color space (e.g., Y). For any two successive frames, if the correlation coefficient is lower than the decision threshold, a scene change may be identified. Otherwise, the two successive frames are assigned a "same scene" or "stable scene" classification.

It should be understood that in different implementations, the system described may make reference to various parameters and criteria in addition to or in place of the histogram data described above. For example, the system may be configured to make use of one or more criteria in order to determine when an image is to be automatically captured and stored while the mobile device is operating in the auto-capture mode. These criteria can include one or more of an auto-focus value, a white balance value, an exposure value, a device stability value, a sharpness value, a gain value, a de-noising value, a contrast value, a flash value, or other such image quality and processing parameters. The auto-capture mode settings can be accessed as part of the general settings for the mobile device, displayed when the auto-mode is first activated, or displayed after a screen appears when the auto-mode is activated asking the user whether the settings are to be changed. A user may be provided with options to set threshold values for the various criteria and parameters to suit their preferences. Thus, in some implementations, when these threshold values are met for a current image sensed by the image sensor, the image can be captured and stored without further input from the user.

These results can be conveyed to an outcome module 290, which determines whether the information indicates that the scene is stable (scene stabilized component 294) or that the scene has changed (scene changed component 292). An automatic image capture module 230 can trigger automatic image capture of the present image based at least on the information received from the outcome module 290. The captured image can be stored in device image storage 242.

In some implementations, image statistics (such as but not limited to histogram data) are substantially continuously generated for each new image frame received by the image sensor, and the camera settings may also be continuously adjusted. In one implementation, these image data are not yet considered "captured" because they are not being finalized or subject to certain post-demosaicing processes that can be computationally intensive and need not be performed unless the image is intended to be converted into a final image ("captured") and stored. In some implementations, while YUV processing (or just Y processing) can occur, and only if the image is to be captured does any further post-processing steps occur.

The device 240 may also be configured to receive user input 202 via a user input processor 270. The user input 202 can vary widely based on the type of input means used. In FIG. 2, the user input 202 can be understood to be associated or correspond with some aspect of the image capture application 250 that is being viewed or accessed by the user. In one implementation, the user input processor 270 can receive data that toggles the automatic capture mode on or off via an image capture mode module 272.

Figure 3A:
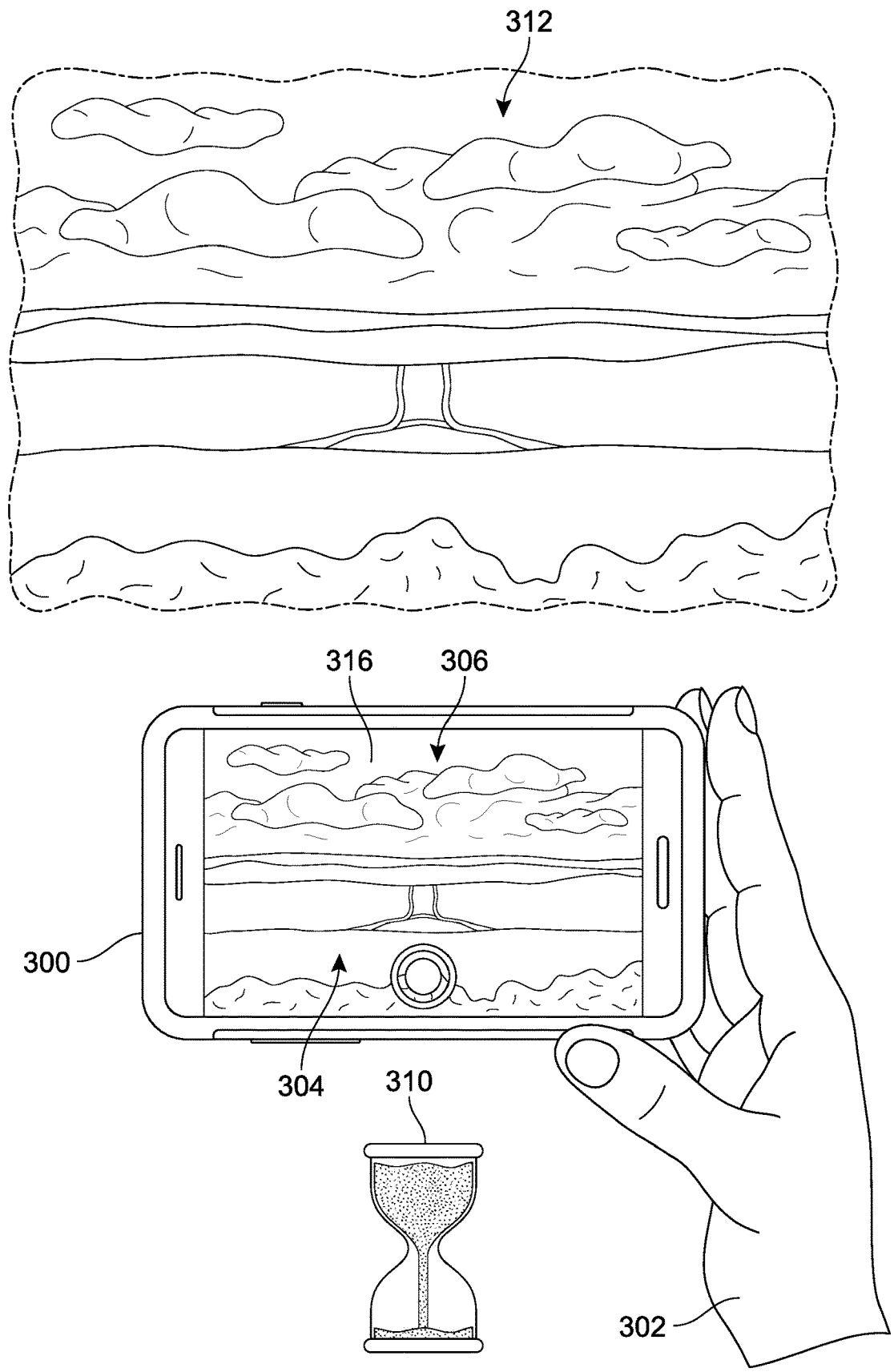
FIGS. 3A and 3B are examples of image capture of two real-world scenes.
Figure 3B:
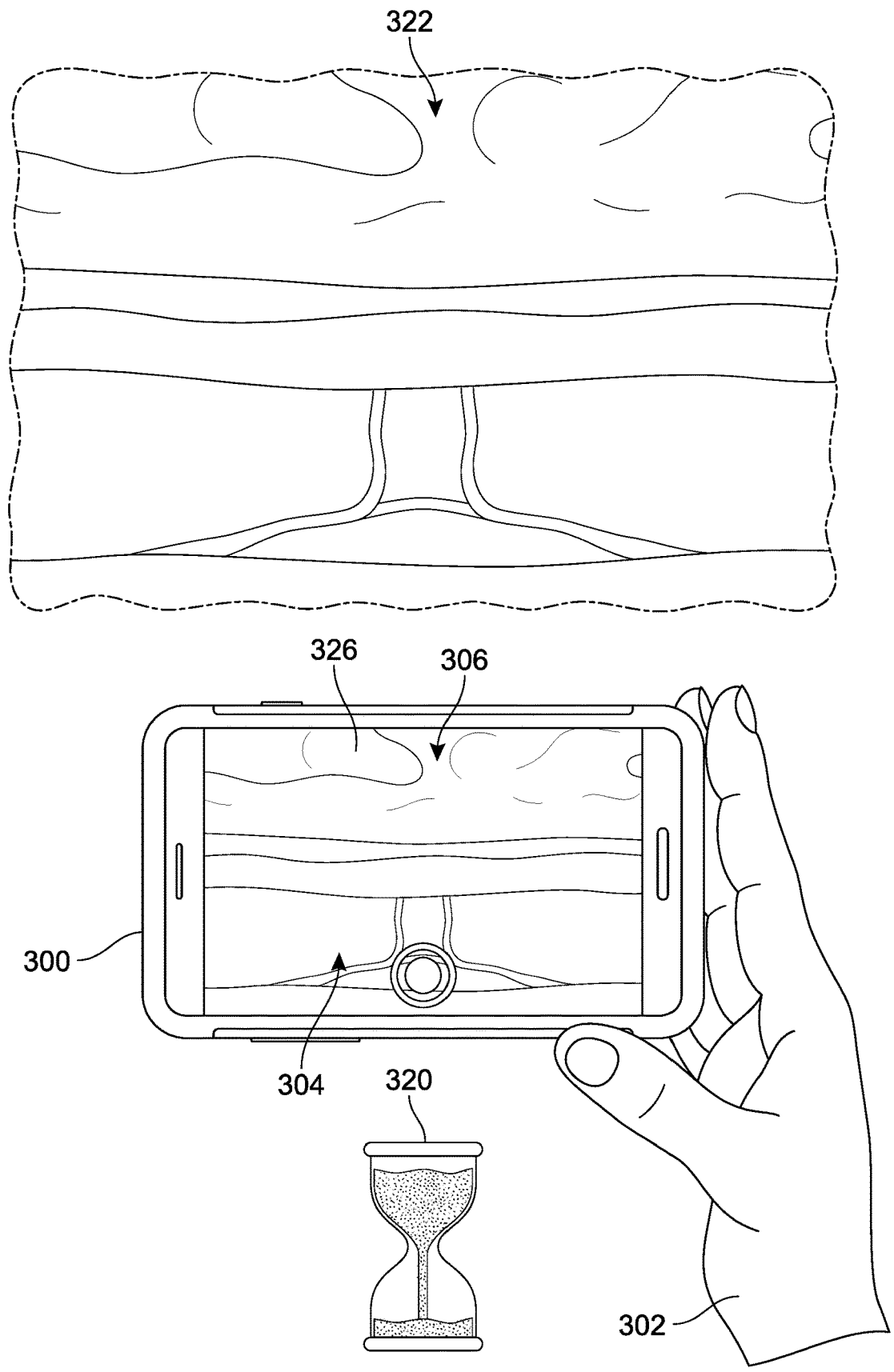

For purposes of clarity, one implementation of an automated image capture process will be presented now with reference to FIGS. 3A-6B. In FIG. 3A, an image capture application ("application") 304 is depicted, represented by a photo-capture graphical user interface (GUI) shown on a display 306 of a second device 300 that presents a live preview of a real-world scene. In different implementations, the application 304 is used to initiate display of the GUI and various user interface elements, features, and controls to facilitate capturing images via a camera (not illustrated), scanning, and/or processing of images.

As noted earlier, in some implementations, the application 300 can be configured to detect when scene changes and scene stabilizations occur. An example of this mechanism is presented in FIGS. 3A-6B, where the GUI is presenting a real-time live preview of a first real-world scene ("first scene") 312 by a camera connected to or integrated in the second device 350 (in this case, a mobile phone). In FIG. 3A, the first scene 312 is a landscape, specifically a view of farmland and sky. A user 302 (represented by a hand) is holding the second device 350 such that the camera is framing the first scene 312 and producing a first image frame ("first image") 316 on the display 306 at a first time 310. At a subsequent, second time 320, the user 302 has moved forward into greater proximity to the farmland, and the camera is framing a second real-world scene ("second scene") 322, thereby producing a second image frame ("second image") 326 on the display 306. In other words, between the first time 310 and the second time 320, the scene being received by the camera has changed.

In some implementations, as discussed above with respect to FIG. 2, the system can be configured to detect changes in scene. Referring to FIGS. 4A and 4B, the first image 316, generated or displayed at the first time 310, is associated with a first histogram 314, and the second image 326, generated or displayed at the second time 320, is associated with a second histogram 316. As the histogram data is evaluated by the system, a determination that the two images are substantially different can be made based on the statistical analysis discussed earlier. In some implementations, as noted above, detection of a scene change can initiate a workflow toward auto-capture.

Figure 5A:
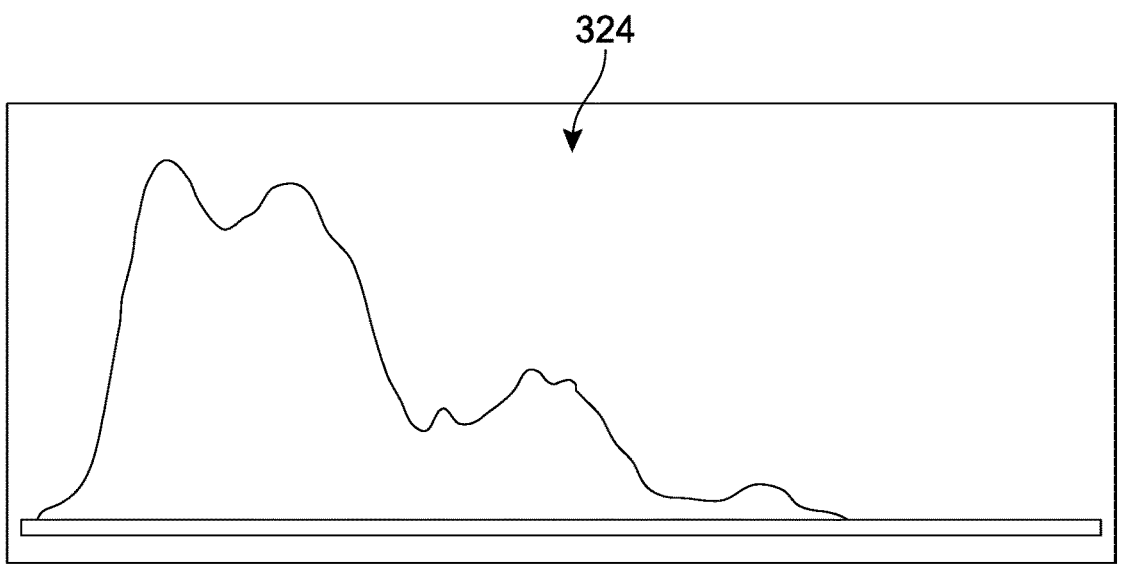
FIGS. 5A and 5B are examples of image capture of two substantially similar real-world scenes.
Figure 5A:
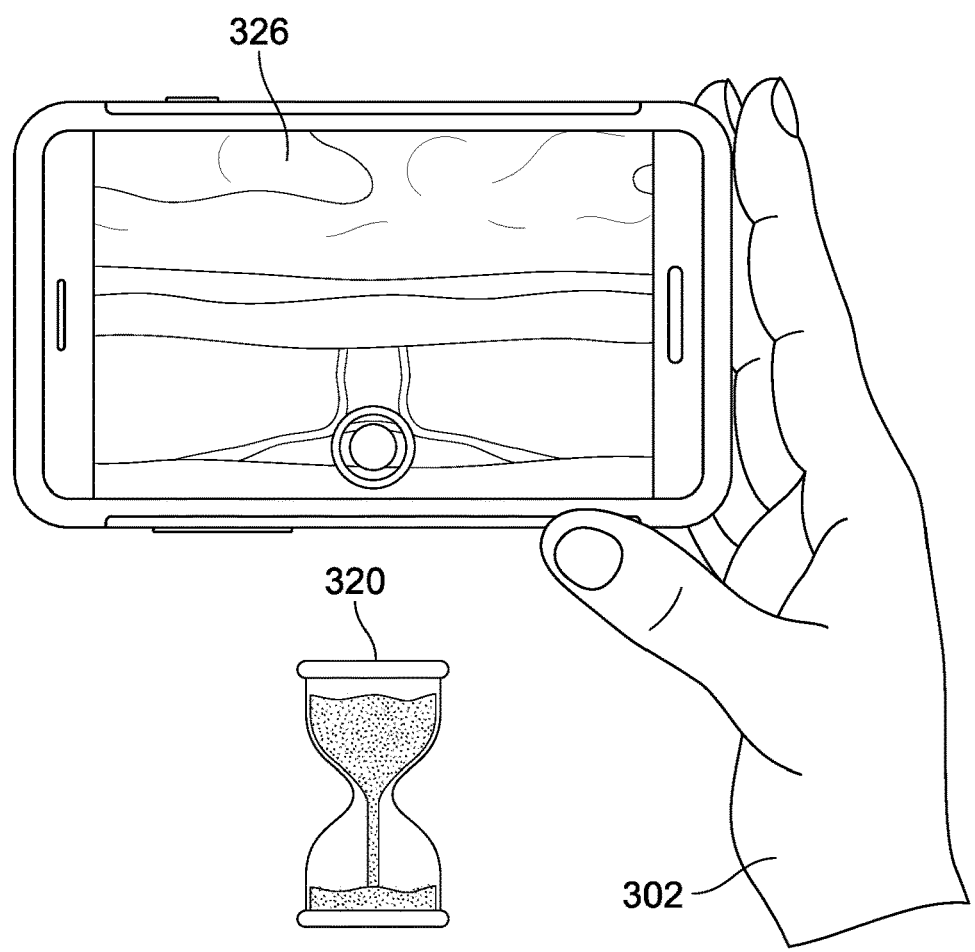
Figure 5B:
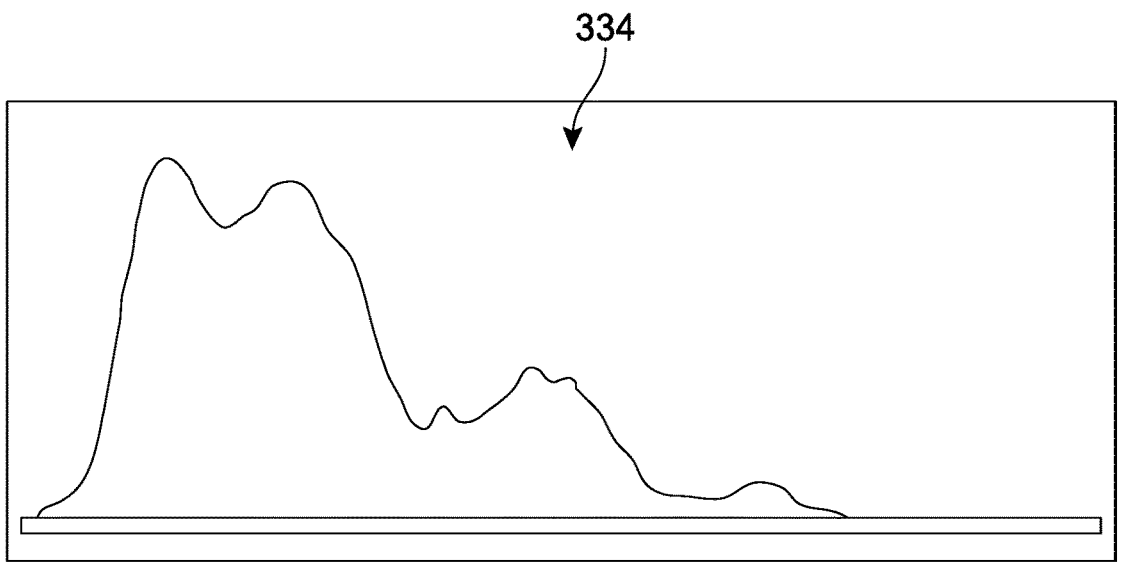
Figure 5B:
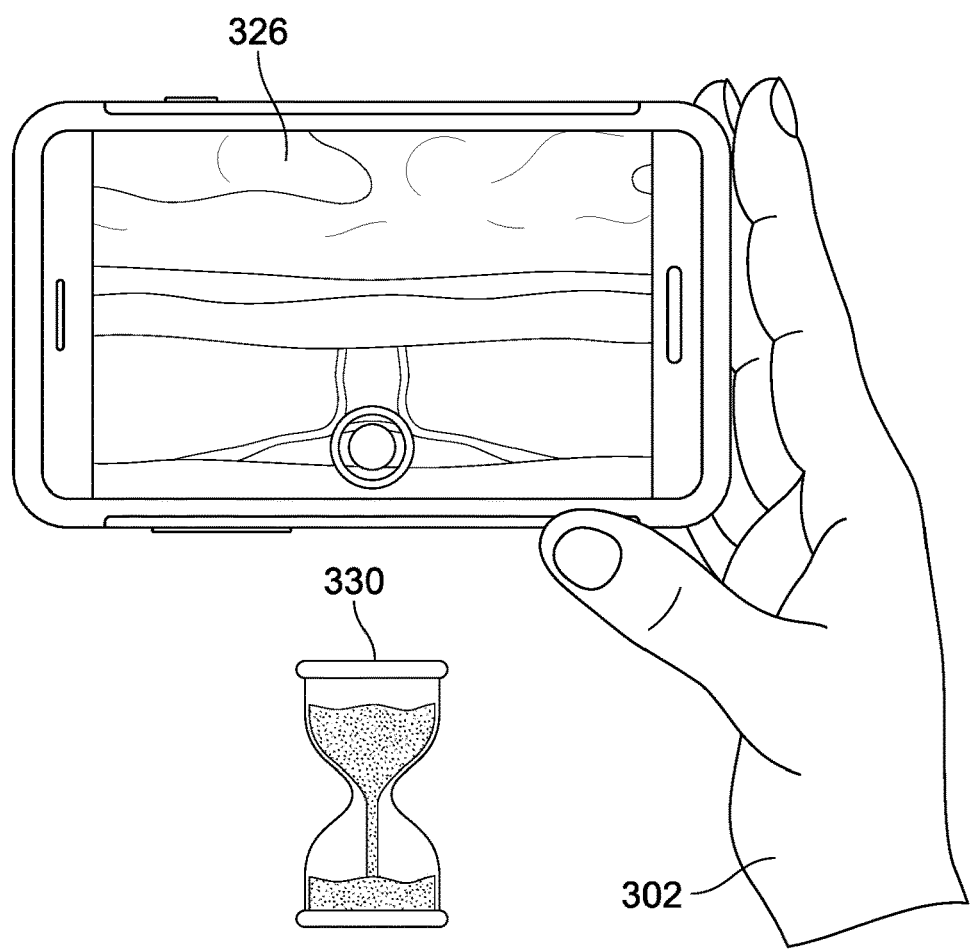

Referring next to FIGS. 5A and 5B, if the system—upon determining a scene change has a sufficiently high probability of having occurred—immediately or shortly thereafter receives information indicating that a sequence of scenes being viewed are similar enough to be considered the same scene (i.e., scene stabilization), auto-capture can be triggered. In FIG. 5A, for purposes of clarity, the user 302 is shown again (as in FIG. 4B) viewing the second scene and receiving the second image 326; the second histogram 324 is also depicted below for ready comparison with the histogram of FIG. 5B. In FIG. 5B, the user 302, at a third time 330 subsequent to both the first time 310 of FIG. 3A and the second time 320, is still viewing generally the same scene and thereby receiving a third image frame ("third image") 336, associated with a third histogram 334. In this example, the system receives data for these frames and determines that there is a sufficiently high probability of the third image 336 representing substantially the same scene as second image 326.

Figure 6B:
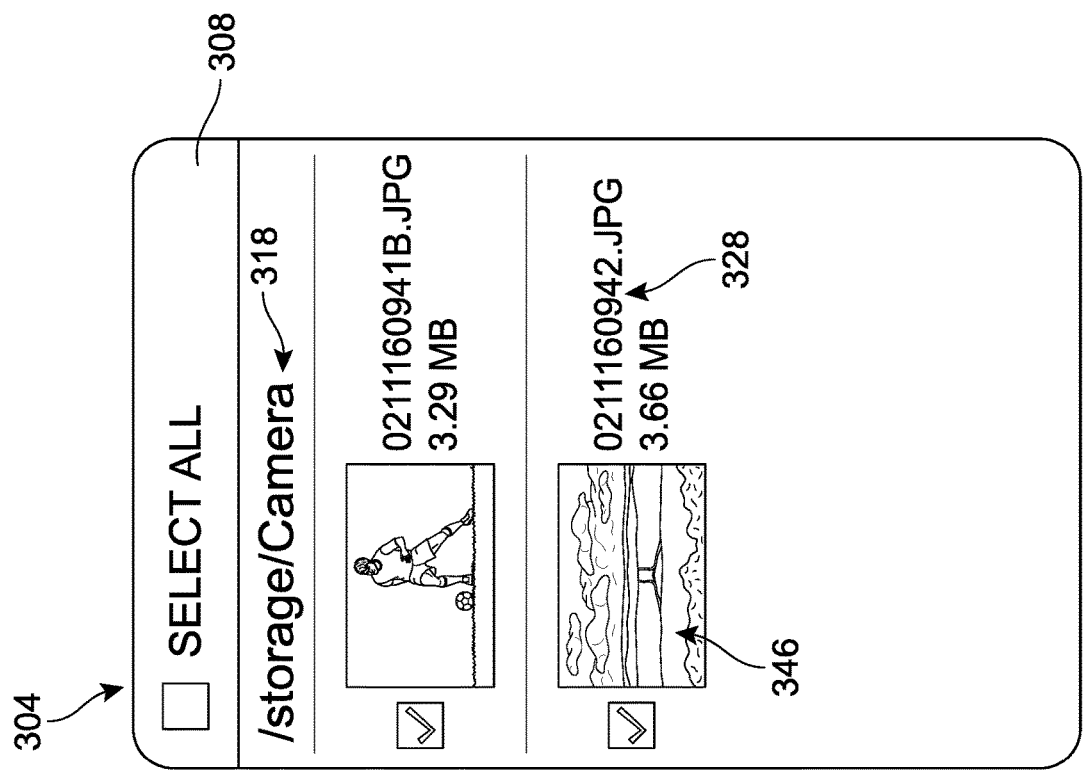
FIGS. 6A and 6B present an implementation of an automatic image capture and an implementation of a user interface for an application configured to manage image storage.
Figure 6A:
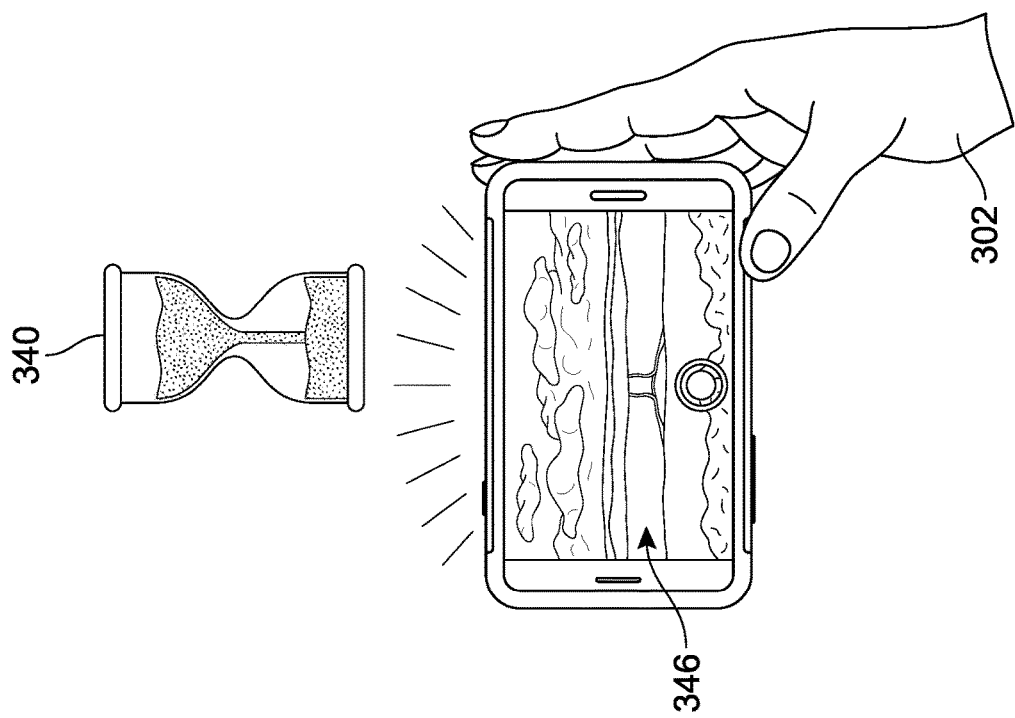

In response to this determination, the system can be configured to trigger an automatic capture of the currently viewed frame, as illustrated in FIG. 6A. At a fourth time 340, the system initiates the automatic capture of the substantially stable scene that followed a scene change. The user 302 has made little or no change in their grip or positioning of the device; in other words, the process of recording a fourth image frame ("fourth image") 346 occurred without user input. In addition, in some implementations, the fourth image 346 can be automatically stored in a designated folder associated with the application 304, as illustrated in FIG. 6B. In this example, the fourth image 346 has been saved in a '/storage/Camera' folder 318 as a first auto-captured image 328, and accessed via a captured images viewing interface 308.

In different implementations, the system can include provisions for detecting scene changes even when the camera location remains substantially stationary. For example, rather than reorienting the camera to receive a different frame, the real-world scene itself can shift, move, or otherwise change, generating a different scene in the live preview. In some other implementations, neither the scenery nor the camera may move, yet a scene chance may be detected. One example is presented with respect to FIGS. 7A-9B. In FIG. 7A, the user is again depicted at the fourth time 340 as viewing the fourth image 346, which has been processed and associated with a fourth histogram 344. At a subsequent, fifth time 350, the user 302 has moved back to decrease her proximity to the farmland, and the camera is framing a view similar to the first real-world scene of FIG. 3A, represented here by a fifth image frame ("fifth image") frame 356, processed and then associated with a fifth histogram 354. As discussed above, the system can be configured to detect changes in scene across a variety of different scenarios.

Figure 7B:
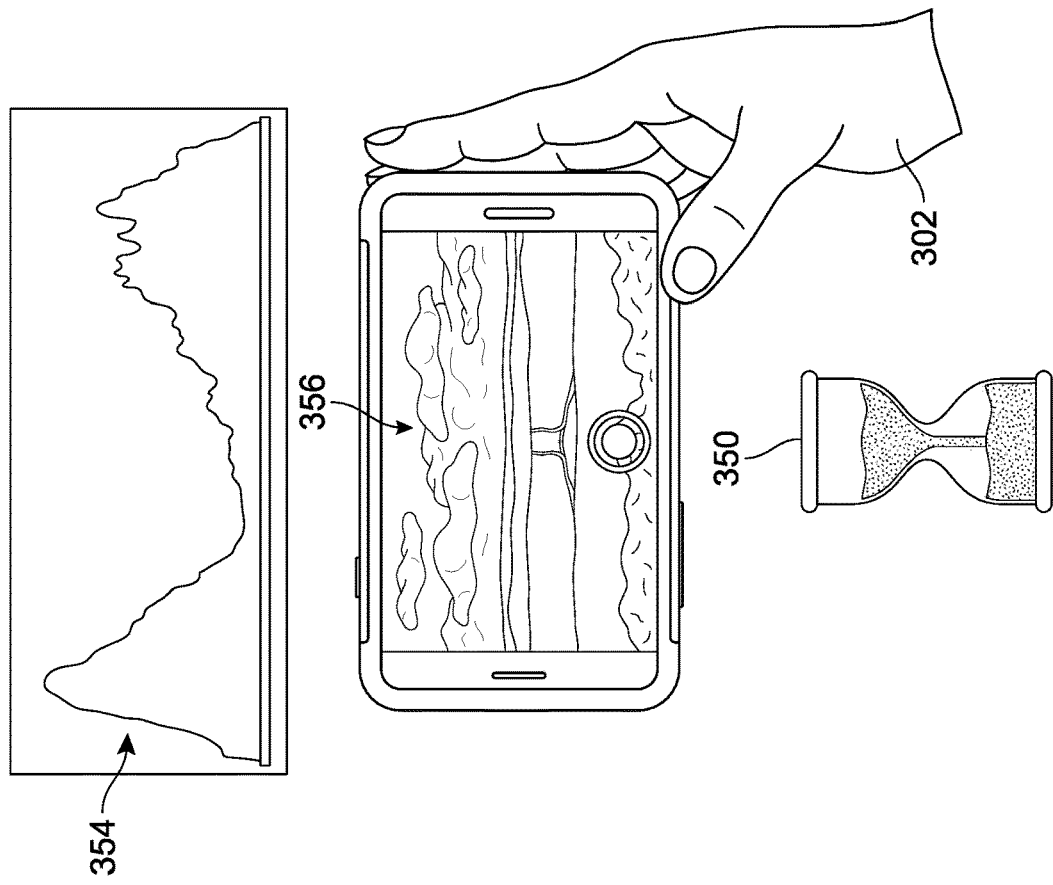
FIGS. 7A-7D are examples of image stabilization followed by a scene change with a corresponding histogram.
Figure 7A:
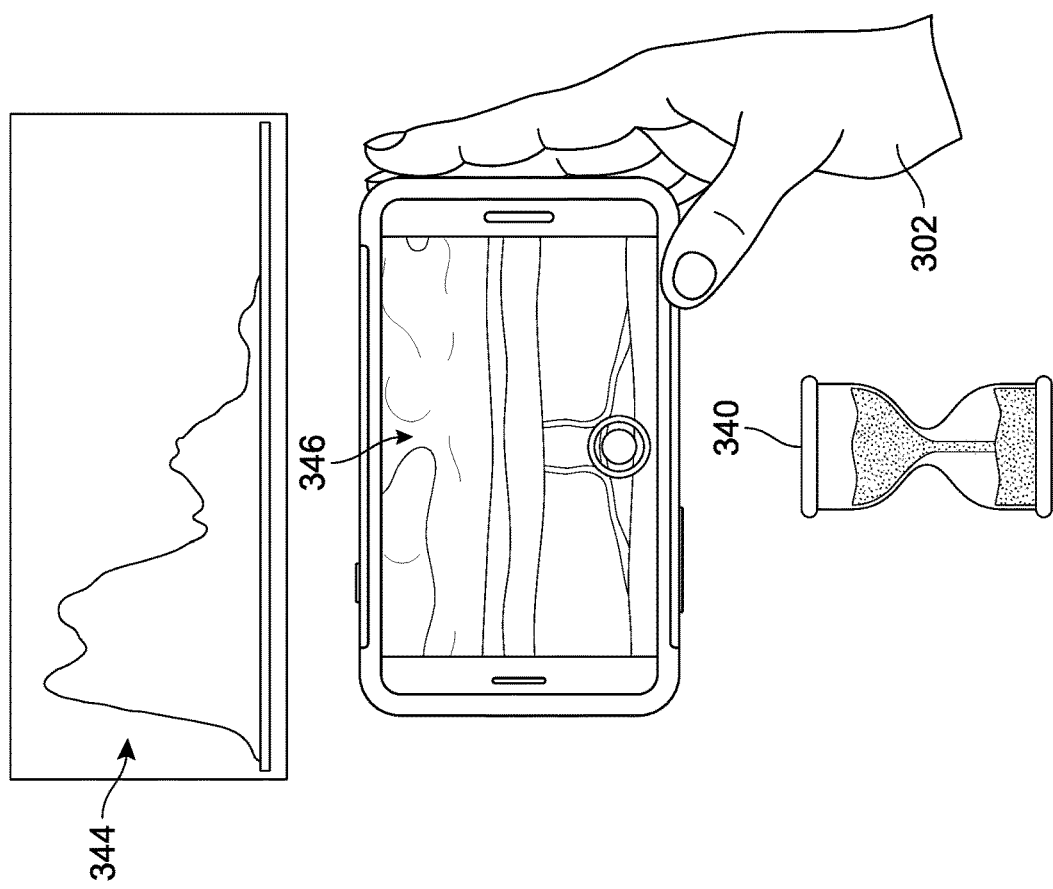
Figure 7C:
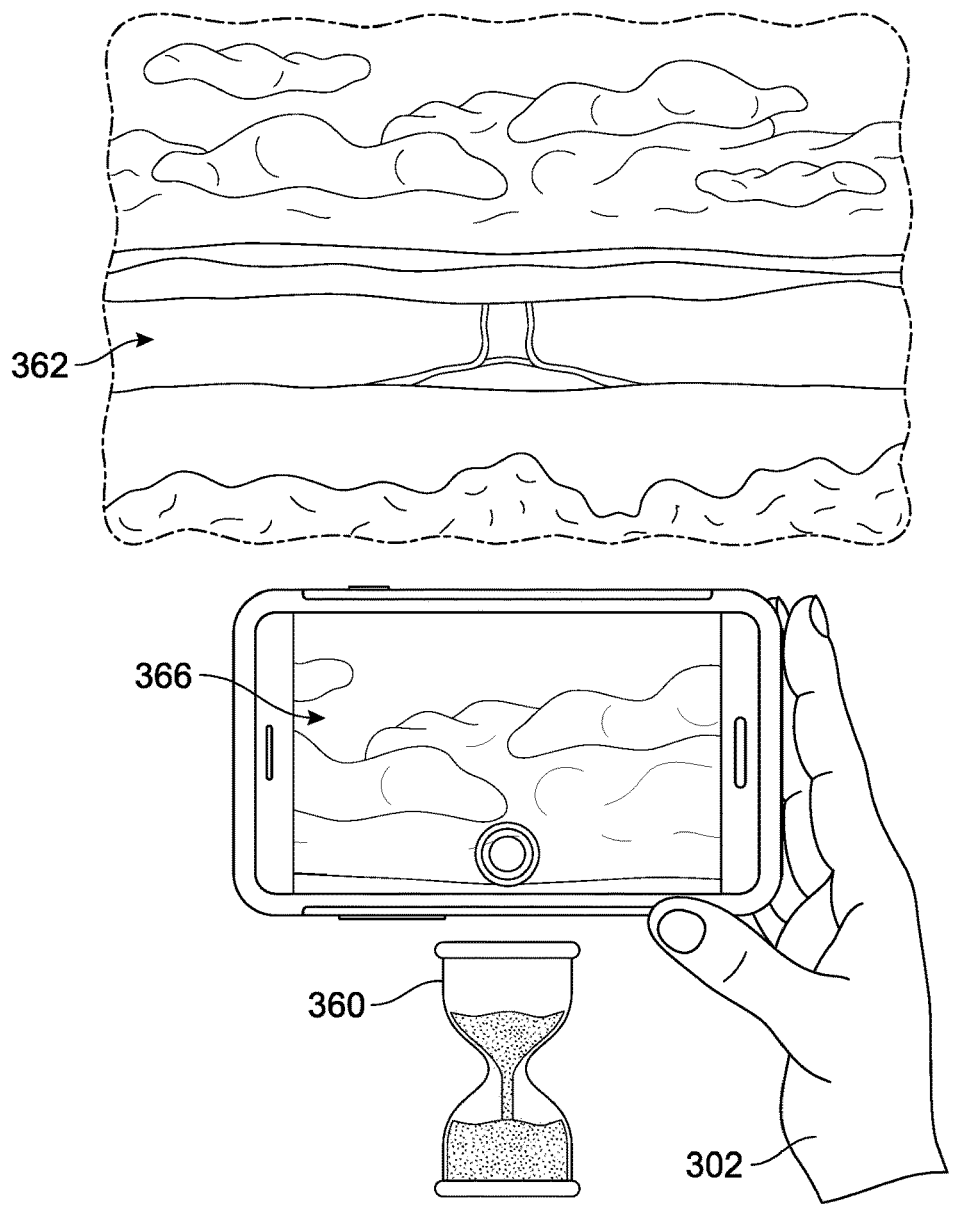
Figure 7D:
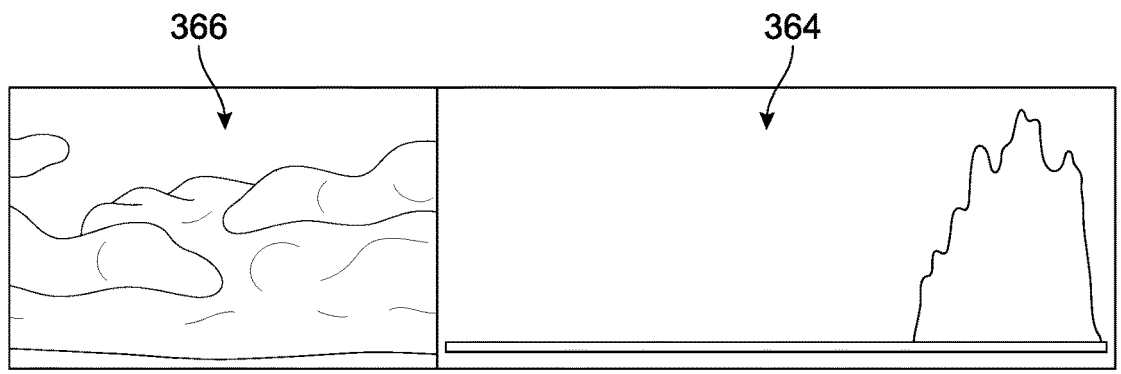

Referring to FIGS. 7A and 7B, the system can compare the histogram data for the fourth image 346 and the fifth image 356. If the system determines these two images are different, the system can again initiate a workflow toward auto-capture. Referring next to FIGS. 7C and 7D, as discussed previously, if the system—upon determining a scene change has a sufficiently high probability of having occurred—immediately or shortly thereafter receives information indicating that a sequence of scenes being viewed are similar enough to be considered the same scene (i.e., scene stabilization), auto-capture can be triggered. In FIG. 7C, for purposes of clarity, the user 302 is shown viewing a third real-world scene ("third scene") 362 based on which the fifth image 356 (see FIG. 7B) was generated. However, while the user 302 continues to view the third scene 362, she also opts to zoom into a specific portion of the fifth image 356 (here shown as clouds and sky) at a sixth time 360 subsequent to the fifth time 350. In other words, although the real-world scene has not changed, and the camera has not moved to the extent that might otherwise have triggered a determination that a scene change occurred, as the user 302 selects or isolates a specific portion of the previous frame, the system can in some implementations be configured to recognize this as a scene change.

In FIG. 7D, the system processes a sixth image frame ("sixth image") frame 366 to produce a sixth histogram 364. It can be readily observed that the sixth histogram 364 (associated with a magnification of an upper region of the fifth image 356 (FIG. 7B)) differs from the data associated with the fifth histogram 354 in FIG. 7B. Thus, user interaction with the application itself, rather than a repositioning of the camera or a change in the landscape, has resulted in the detection of a scene change by the system, triggering the workflow toward auto-capture.

Figure 8B:
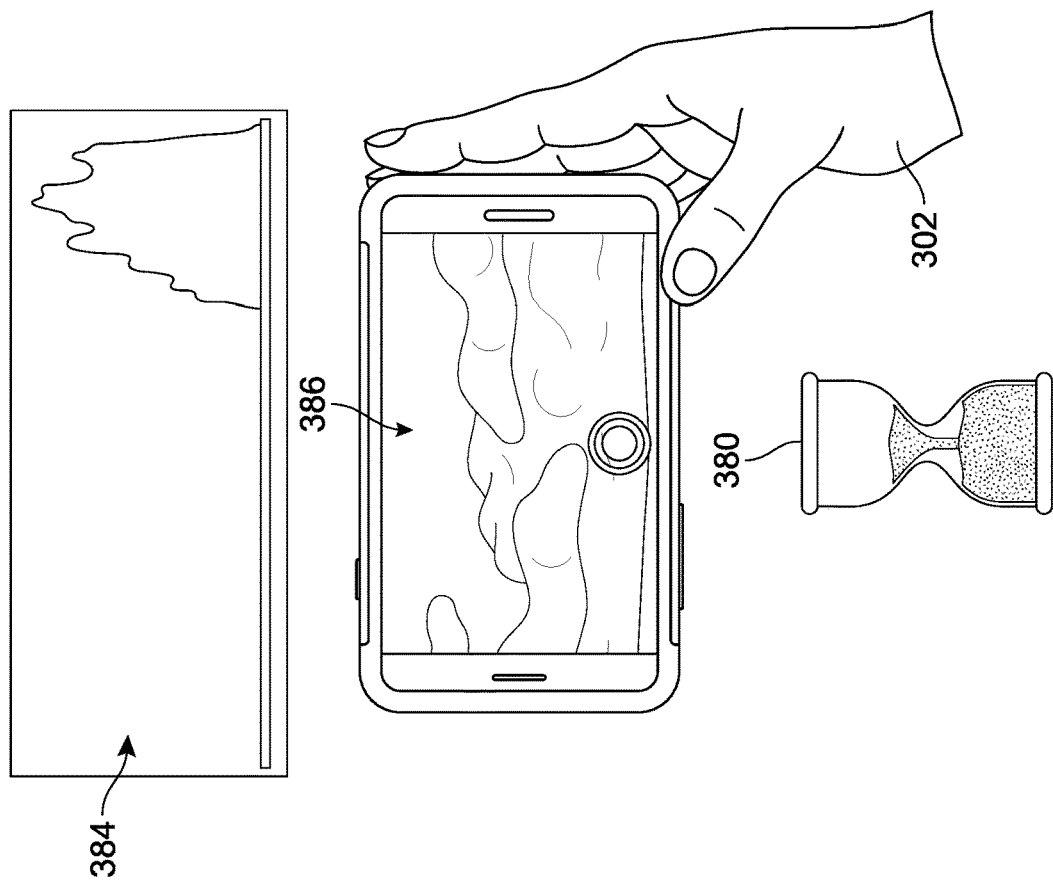
FIGS. 8A and 8B are examples of image stabilization of the new real-world scene and the corresponding histograms.
Figure 8A:
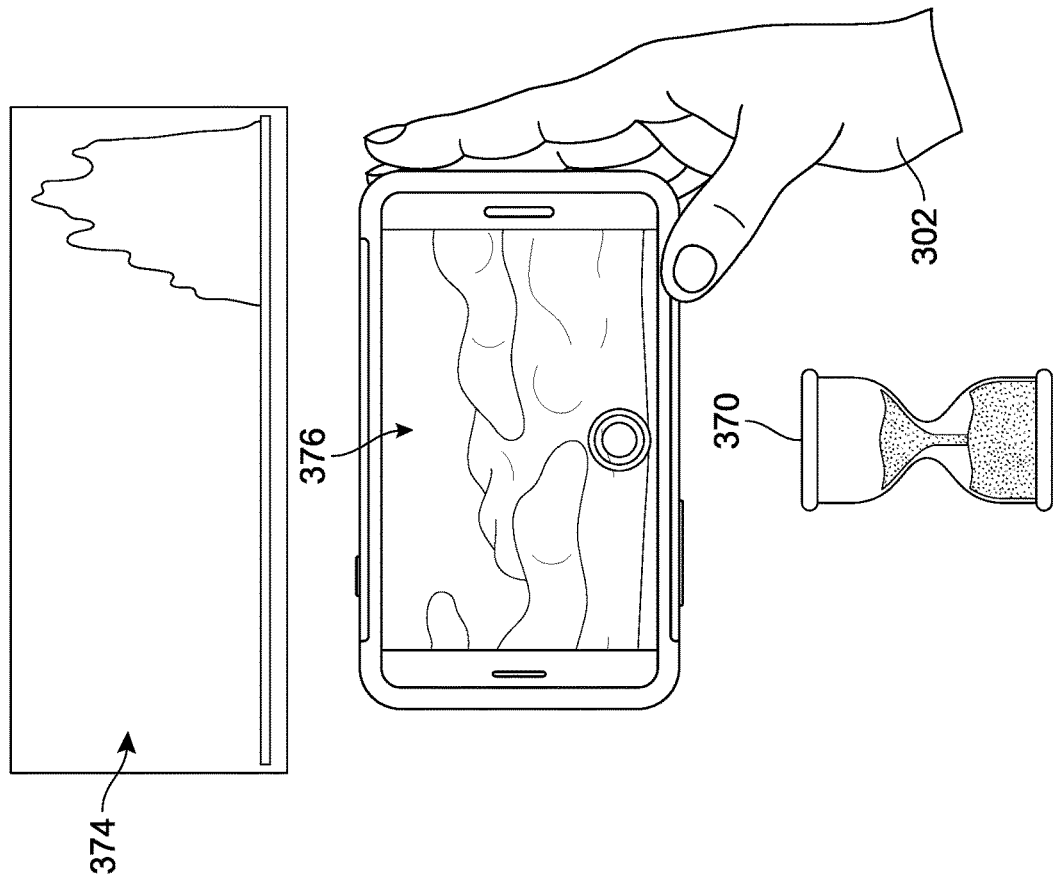

In different implementations, the minimum period of time and/or the number of frames across which a scene stabilization should occur can be a default value or may be adjustable or customizable by a user. Referring next to FIG. 8A, at a seventh time 370 (subsequent to the sixth time 360 of FIG. 7C) the user 302 is continuing to view substantially the same scene, represented by a seventh image frame ("seventh image") 376 and associated with a seventh histogram 374. In FIG. 8B, at an eighth time 380 that is subsequent to the seventh time 370, the user 302 is also continuing to view substantially the same scene, represented by an eighth image frame ("eighth image") 386 that is associated with an eighth histogram 384. Thus, in some implementations, the system in this case can be configured to compare the histogram data for three (or more) consecutive and/or substantially continuous time periods (sixth time 360, seventh time 370, and eighth time 380), rather than only two as was illustrated earlier with respect to FIGS. 3A-6B.

Figure 9B:
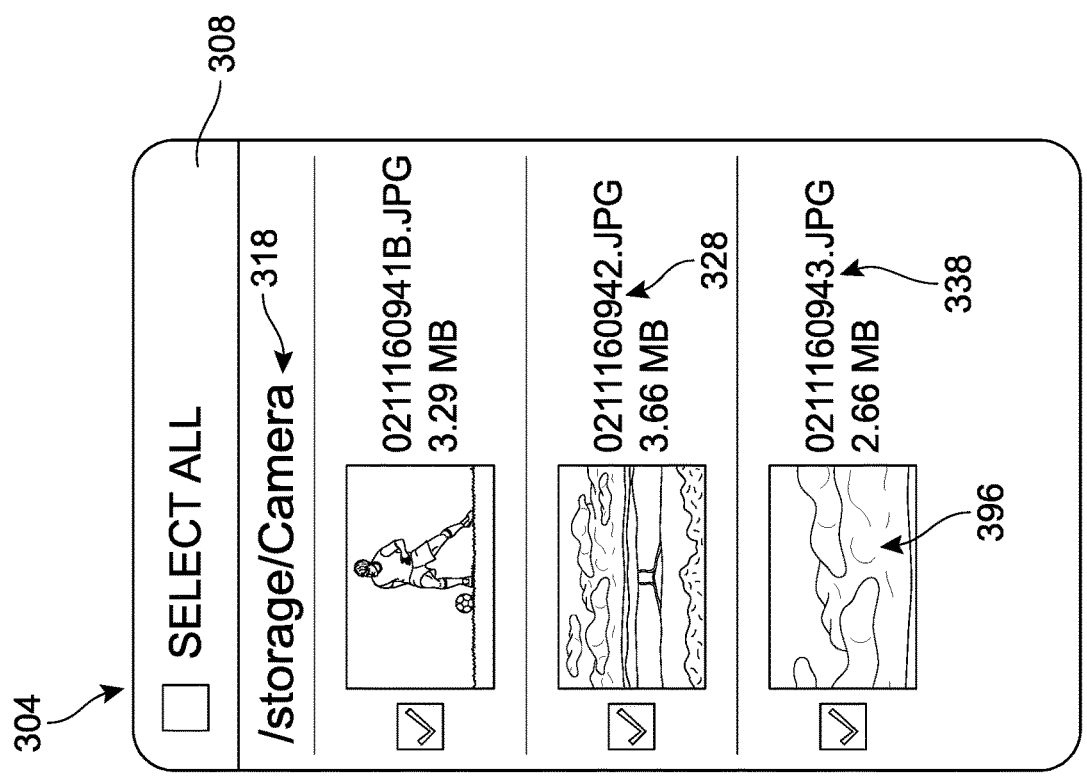
FIGS. 9A and 9B present an implementation of an automatic image capture and an implementation of a user interface for an application configured to manage image storage.
Figure 9A:
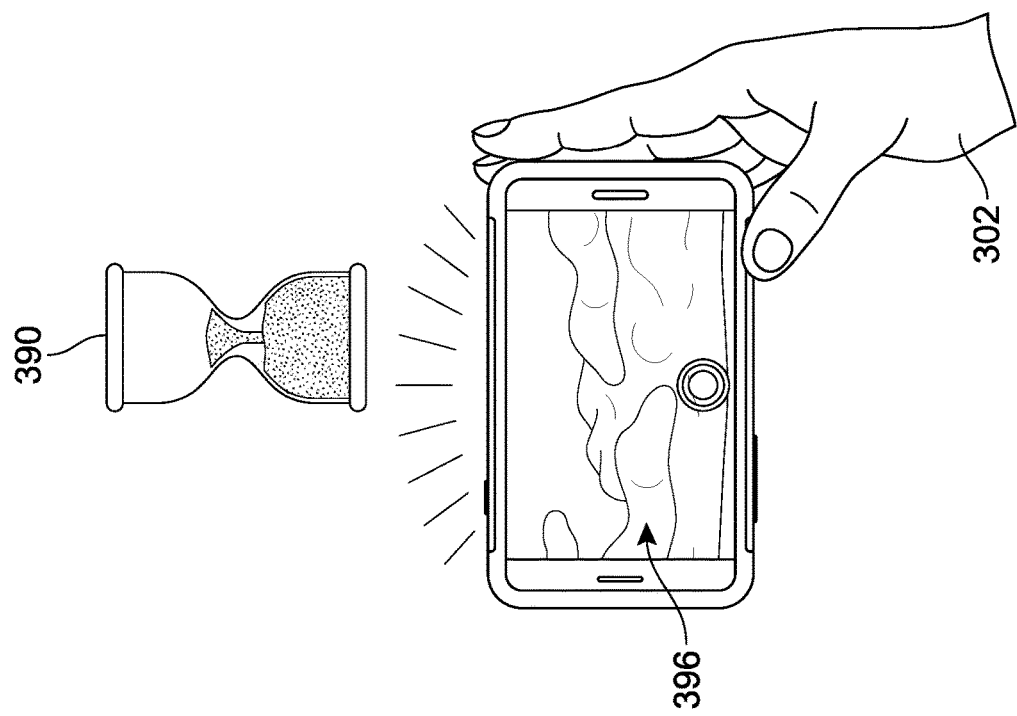

In this example, the system receives data for these three frames and determines that there is a sufficiently high probability of the eighth image 386 representing the substantially same scene as both seventh image 376 and sixth image 366. In response to this determination, the system can trigger an automatic capture of the currently viewed frame, as illustrated in FIG. 9A. At a ninth time 390, the system initiates the automatic capture of the substantially stable scene that followed a scene change. The user 302 has made little or no change in their grip or positioning of the device; in other words, the process of recording a ninth image frame ("ninth image") 396 occurs without user input. In addition, in some implementations, the ninth image 396 can be automatically stored in a designated folder associated with the application 304, as illustrated in FIG. 9B. In this example, the ninth image 396 has been saved in the '/storage/Camera' folder 318 as a second auto-captured image 338, accessed via captured images viewing interface 308.

As noted above, in some implementations, the system can include provisions for adjusting the scene stabilization parameters. Scene stability value can be computed using data received from histograms, and/or one or more accelerometers and/or one or more gyroscopes associated with the mobile device. The magnitude of the difference between one histogram and a second histogram can be conceptually viewed as corresponding to the sensitivity for determining whether the scene is stable in one implementation. In other implementations, the threshold value (see FIG. 2) is set to a specific value, but the period of time and/or number of image frames across which any changes or similarities in histogram data must satisfy the threshold value is variable. In such implementations, the variable period of time is used as the scene stability value or as a factor in the scene stability value. In still other implementations, both the threshold value and the time period are adjusted with changes to the scene stability value. Other techniques for determining scene stability and for adjusting the sensitivity of such a determination can also be used with implementations of the disclosed systems. As one non-limiting example, a UI can present an interactive slider that is adjustable between "low" (indicating lower sensitivity, and thus allowing more contrast between two histograms to be tolerated while determining whether the scene is stable or stationary) and "high" (indicating higher sensitivity, and thus allowing for less contrast to be tolerated while determining whether the scene is stable or stationary). In other implementations, the UI can present actual values that may be set by a user.

In some implementations, the system can include provisions for adjusting the number of photos taken while the device is in auto-capture mode. As one example, when the mobile device is operating in auto-capture mode, the system can be configured to automatically capture images in a substantially continuous operation until the auto-capture mode is deactivated or captures a predetermined number of images. In another implementation, the system can be configured to change the length of a pause between auto-capture mode activation and image capture and storing. For example, when the mobile device is first set into auto-capture mode, image capturing and storage may be momentarily suspended so that the user can orient the camera into the direction of the intended subject.

The example criteria and parameters described herein should not be construed as limiting, as fewer criteria can be used or additional criteria added. In general, any combination or sub-combination of image capture criteria can be used as thresholds for triggering automatic image capture and can be adjustable through an auto-capture mode settings screen. In addition, once the desired image capture criteria are set, the user can exit the auto-capture mode settings screen.

Figure 10:
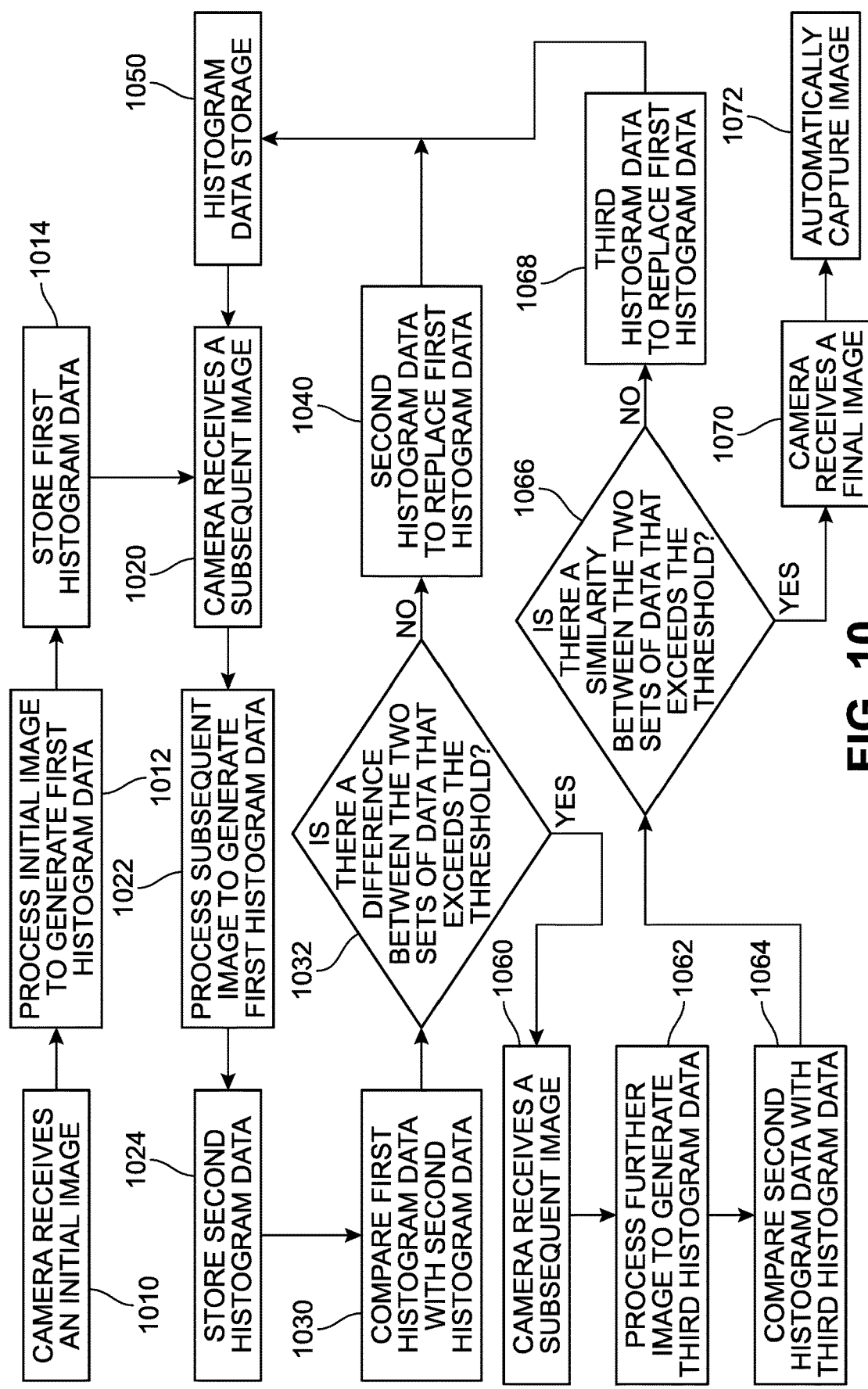
FIG. 10 is a process flow diagram of an implementation for an automatic image capture tool.

For purposes of clarity, FIG. 10 illustrates one implementation of a process for initiating an auto-capture on a camera via some of the systems described herein. It should be understood that the implementation of this process will be configured to occur mainly as a result of a user selection of auto-capture mode. In this example, a first stage 1210 includes the receipt of an initial image by a camera. For example, the image can be a live preview of the scene being projected through the optical lens of the camera, and can be shown to a user on a display for a device, usually via an image capture application being accessed or executed by the device. In a second stage 1012, the system can process the initial image to generate a first set of histogram data. In some implementations, this processing requires a minimal use of the device processors and memory, as the focus of the image processing can be limited to one color channel (e.g., "Y"). The first histogram data can be stored in a histogram data storage module in a third stage 1014.

In a fourth stage 1020, the camera receives another image, which for purposes of simplicity will be referred to as a "subsequent image". This subsequent image is processed in a fifth stage 1022 to generate a second set of histogram data. This data can be stored in the histogram data storage module in a sixth stage 1024. It should be understood that the gap or interval of time and/or number of frames received between the initial image and the subsequent image can vary widely as per user preferences and system settings. Thus, while the initial image and the subsequent image can be configured to immediately follow one another, in other implementations they may be spaced apart by several seconds or milliseconds or less, and/or by a particular number of frames that are received by the camera optical system in which histogram data is not generated.

In a seventh stage 1030, the system accesses the histogram data storage module 1050 and—as discussed earlier—compares the first set of data with the second set of data. If (eighth step 1032) a determination is made that there is a difference between the two sets of data that exceeds a pre-established or predefined threshold, or otherwise indicates a sufficient probability that the two sets represent substantially different images (e.g., change of scene), the system can continue on the path toward auto-capture. If instead the comparison indicates that there is little difference between the two sets of data, and the two images are likely representing the same (or substantially similar) scene, the system can be configured to move the second set of data up in the queue. In other words (ninth stage 1040), the second set of histogram data can replace or become substituted for the first set of histogram data for purposes of this flow diagram. Thus, along this path direction, references to the first set of histogram data will be referring to the data generated for an image prior to the receipt of the next subsequent image.

Returning to the previous stage and successful difference determination, as the auto-capture process continues to progress, the camera can receive another image (tenth stage 1060), which for purposes of simplicity will be referred to as a "further image". This further image is processed in an eleventh stage 1062 to generate a third set of histogram data. The third set of data can be optionally stored in the histogram data storage module; however, in some other cases, the third set of data can be held in current memory until the next determination is made. It should be understood that the gap or interval of time and/or number of frames received between the subsequent image and the further image can vary widely as per pre-established user preferences and system settings. Thus, while the subsequent image and the further image can be configured to immediately follow one another, in other implementations they may be spaced apart by several seconds or milliseconds or less, and/or by a particular number of frames that are received by the camera optical system in which histogram data is not generated.

In a twelfth stage 1064, the system accesses the histogram data storage module 1050 and compares the second set of data with the third set of data. If (thirteenth step 1066) a determination is made that the two sets of data are similar to a amount that exceeds a pre-established or predefined threshold, or otherwise indicates a sufficient probability that the two sets represent substantially similar images (e.g., images representing the same scene), the system can continue on the path toward auto-capture. If instead the comparison indicates that there is a difference between the two sets of data that exceeds a pre-established or predefined threshold, or otherwise indicates a sufficient probability that the two sets represent substantially different images (e.g., change of scene), the system can be configured to move the third set of data up in the queue. In other words (fourteenth stage 1068), the third set of histogram data can replace or become substituted for the first set of histogram data for purposes of this flow diagram. Thus, along this path direction, references to the first set of histogram data will be referring to the data generated for an image prior to the receipt of another subsequent image.

Returning to the previous stage and successful similarity determination, as the auto-capture process continues to progress, the camera can receive another image (fifteenth stage 1070), which for purposes of simplicity will be referred to as a "final image". This final image is automatically captured by the camera. The process can continue to repeat or cycle to capture a series of images that are received following detection of a scene change followed by a scene stabilization.

Figure 11:
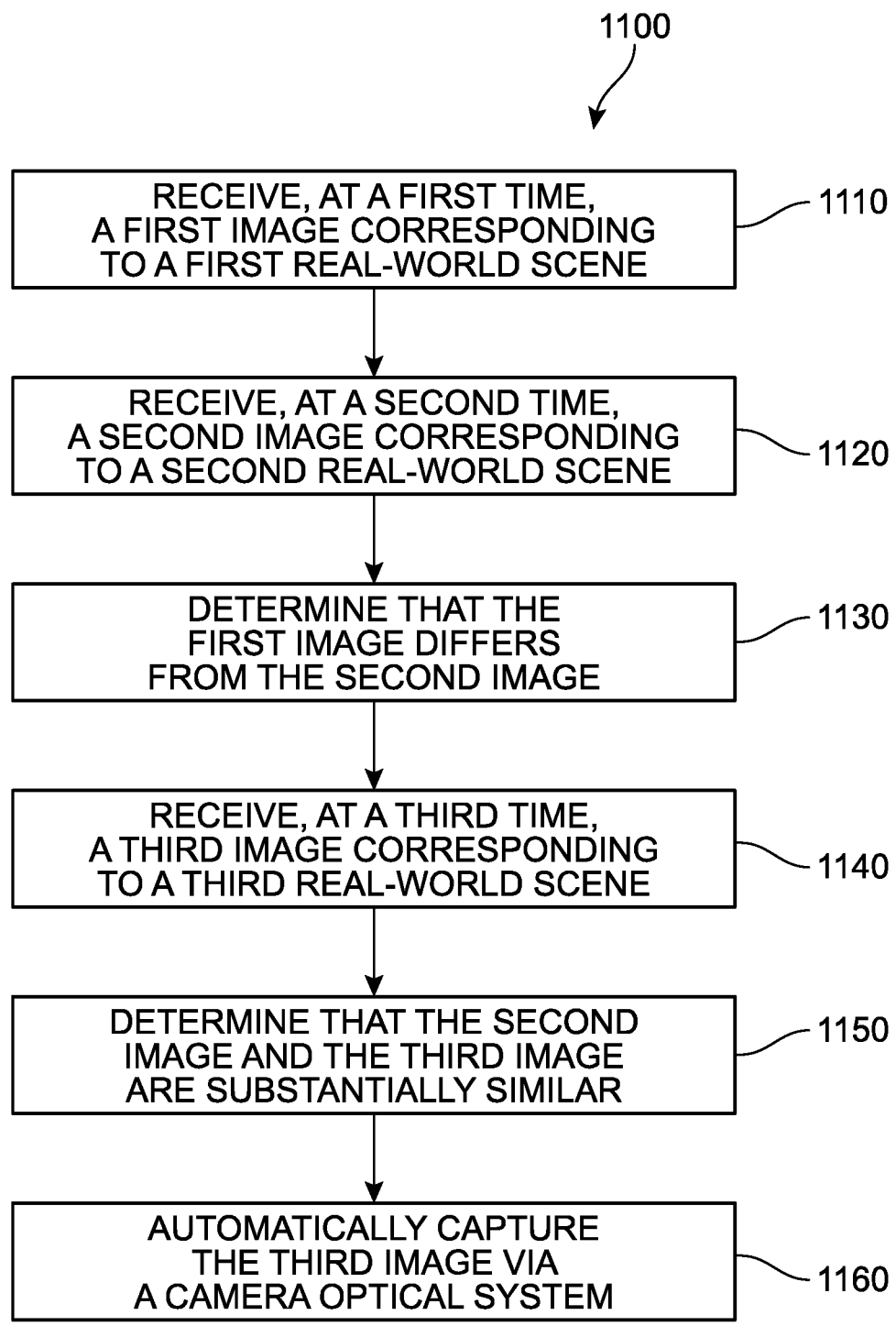
FIG. 11 is a flow diagram illustrating an implementation of a process for managing automatic image capture.

FIG. 11 is a flow chart illustrating an implementation of a method 1100 of managing the automatic capture of images. In FIG. 11, a first step 1110 includes receiving, at a first time, a first image corresponding to a first real-world scene, and a second step 1120 includes receiving, at a second time subsequent to the first time, a second image corresponding to a second real-world scene. In addition, the method includes determining that the first image differs by at least a first amount from the second image in a third step 1130, and receiving, at a third time subsequent to the second time, a third image corresponding to a third real-world scene in a fourth step 1140. The method also involves a fifth step 1150 of determining that the second image and the third image are substantially similar; and a sixth step 1160 of automatically capturing, in response to determining the second image and third image are substantially similar, at least a first region of the third image via a camera optical system.

In other implementations, the method can include additional or alternate steps. For example, the method may further include generating a first histogram for the first image, and generating a second histogram for the second image. In some cases, determining that the first image differs from the second image is based at least on a comparison of the first histogram with the second histogram. As another example, the method can include obtaining luminance or color values for the first image, and generation of the first histogram is based on the obtained luminance or color values for the first image. In some instances, the first histogram identifies a first number of pixels associated with a first luminance or color value, and the second histogram identifies a second number of pixels associated with the first luminance or color value. In such cases, the method can also involve determining that the first number of pixels differs from the second number of pixels by at least the first amount.

Furthermore, in some implementations, the method may involve generating a first histogram for the second image, and generating a second histogram for the third image. In such cases, determining that the second image is substantially similar to the third image is based at least on a comparison of the first histogram with the second histogram. In some cases, the first histogram identifies a first number of pixels associated with a first luminance or color value, and the second histogram identifies a second number of pixels associated with the first luminance or color value. The method can then further involve determining that the first number of pixels differs from the second number of pixels by at most a predetermined percentage.

As another example, the method may include generating a third histogram for the third image, storing first data associated with the first histogram, second data associated with the second histogram, and third data associated with the third histogram, and then automatically discarding, in response to determining that the second image and the third image are substantially similar, the first data. In one implementation, the method may also include storing first data associated with the first histogram and second data associated with the second histogram, receiving, at a fourth time subsequent to capturing the third image, a fourth image corresponding to a fourth real-world scene, generating a third histogram for the fourth image, storing third data associated with the third histogram, determining that the third image differs by at least a second amount from the fourth image, and automatically discarding, in response to determining that the third image and the fourth image differ, the first data.

In some implementations, the method further includes receiving a first user input requesting activation of an automatic image capture mode, wherein the automatic capture of at least the first region of the third image is based in part on receiving the first user input. In another implementation, the second time and the third time are spaced apart by at least a predetermined period of time second zone.

Thus, the use of the disclosed systems and methods can enable users to easily tap to select a point in an image and in response provide one or more quad candidates that are identified as having that point in their interior. If a user taps at multiple places in succession, he or she will be presented with multiple quads in succession. The ability to deliberately select one or more regions in an image for scanning, both in real-time image capture and in stored images, offers a wide range of benefits to users. This feature substantially reduces the time needed to scan various items; rather than attempting to re-capture or modify images to obtain the desired region, a user may submit an input indicating a target locus that is present in the desired region, and the application can then automatically detect region(s) that include the target locus. Furthermore, by offering users a simple means by which to select multiple, discrete regions for scanning within a single image, multiple images need not be collected or stored to obtain the scans, and the process will occur over a much shorter duration.

For the sake of simplicity of description, details are not provided herein for performing various image processing steps. Implementations of the present disclosure can make use of any of the features, systems, components, devices, and methods described in U.S. Pat. No. 9,516,227 to Chau, et al., issued on Dec. 6, 2016 and entitled "Camera non-touch switch"; U.S. Pat. No. 6,965,645 to Zhang et al., issued on Nov. 15, 2005 and entitled "Content-based characterization of video frame sequences"; U.S. Pat. No. 7,408,986 to Winder, issued on Aug. 5, 2008 and entitled "Increasing motion smoothness using frame interpolation with motion analysis"; U.S. Patent Publication Number 2017/0140250 to Maloney et al., published on May 18, 2017 and entitled "Content file image analysis"; and U.S. Pat. No. 9,596,398 to Khawand, issued on Mar. 14, 2017 and entitled "Automatic image capture", the disclosures of which are herein incorporated by reference in their entirety.

The detailed examples of systems, devices, and techniques described in connection with FIGS. 1-11 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-11 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 12:
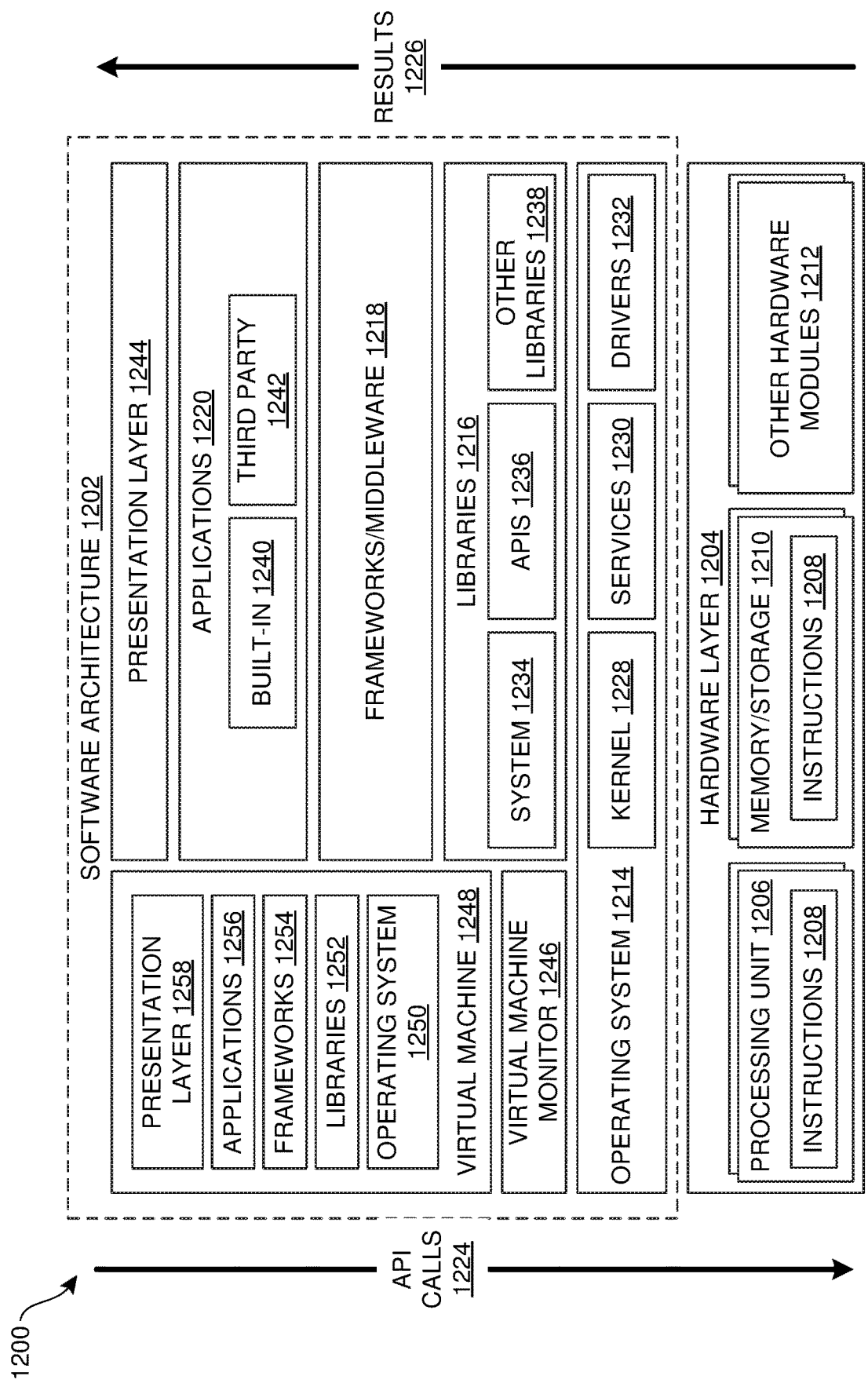
FIG. 12 is a block diagram of an example computing device, which may be used to provide implementations of the mechanisms described herein.

FIG. 12 is a block diagram 1200 illustrating an example software architecture 1202, various portions of which may be used in conjunction with various hardware architectures herein described, which may implement any of the above-described features. FIG. 12 is a non-limiting example of a software architecture and it will be appreciated that many other architectures may be implemented to facilitate the functionality described herein. The software architecture 1202 may execute on hardware such as a first device 102 of FIG. 1A and second device 300 of FIG. 3A that include, among other things, document storage 1070, processors, memory, and input/output (I/O) components. A representative hardware layer 1204 is illustrated and can represent, for example, the devices described herein. The representative hardware layer 1204 includes a processing unit 1206 and associated executable instructions 1208. The executable instructions 1208 represent executable instructions of the software architecture 1202, including implementation of the methods, modules and so forth described herein. The hardware layer 1204 also includes a memory/storage 1210, which also includes the executable instructions 1208 and accompanying data. The hardware layer 1204 may also include other hardware modules 1212. Instructions 1208 held by processing unit 1208 may be portions of instructions 1208 held by the memory/storage 1210.

The example software architecture 1202 may be conceptualized as layers, each providing various functionality. For example, the software architecture 1202 may include layers and components such as an operating system (OS) 1214, libraries 1216, frameworks 1218, applications 1220, and a presentation layer 1244. Operationally, the applications 1220 and/or other components within the layers may invoke API calls 1224 to other layers and receive corresponding results 1226. The layers illustrated are representative in nature and other software architectures may include additional or different layers. For example, some mobile or special purpose operating systems may not provide the frameworks/middleware 1218.

The OS 1214 may manage hardware resources and provide common services. The OS 1214 may include, for example, a kernel 1228, services 1230, and drivers 1232. The kernel 1228 may act as an abstraction layer between the hardware layer 1204 and other software layers. For example, the kernel 1228 may be responsible for memory management, processor management (for example, scheduling), component management, networking, security settings, and so on. The services 1230 may provide other common services for the other software layers. The drivers 1232 may be responsible for controlling or interfacing with the underlying hardware layer 1204. For instance, the drivers 1232 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1216 may provide a common infrastructure that may be used by the applications 1220 and/or other components and/or layers. The libraries 1216 typically provide functionality for use by other software modules to perform tasks, rather than rather than interacting directly with the OS 1214. The libraries 1216 may include system libraries 1234 (for example, C standard library) that may provide functions such as memory allocation, string manipulation, file operations. In addition, the libraries 1216 may include API libraries 1236 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1216 may also include a wide variety of other libraries 1238 to provide many functions for applications 1220 and other software modules.

The frameworks 1218 (also sometimes referred to as middleware) provide a higher-level common infrastructure that may be used by the applications 1220 and/or other software modules. For example, the frameworks 1218 may provide various graphic user interface (GUI) functions, high-level resource management, or high-level location services. The frameworks 1218 may provide a broad spectrum of other APIs for applications 1220 and/or other software modules.

The applications 1220 include built-in applications 1240 and/or third-party applications 1242. Examples of built-in applications 1240 may include, but are not limited to, a contacts application, a browser application, a location application, a media application, a messaging application, and/or a game application. Third-party applications 1242 may include any applications developed by an entity other than the vendor of the particular platform. The applications 1220 may use functions available via OS 1214, libraries 1216, frameworks 1218, and presentation layer 1244 to create user interfaces to interact with users.

Some software architectures use virtual machines, as illustrated by a virtual machine 1248. The virtual machine 1248 provides an execution environment where applications/modules can execute as if they were executing on a hardware machine (such as the machine 1000 of FIG. 10, for example). The virtual machine 1248 may be hosted by a host OS (for example, OS 1214) or hypervisor, and may have a virtual machine monitor 1246 which manages operation of the virtual machine 1248 and interoperation with the host operating system. A software architecture, which may be different from software architecture 1202 outside of the virtual machine, executes within the virtual machine 1248 such as an OS 1250, libraries 1252, frameworks 1254, applications 1256, and/or a presentation layer 1258.

Figure 13:
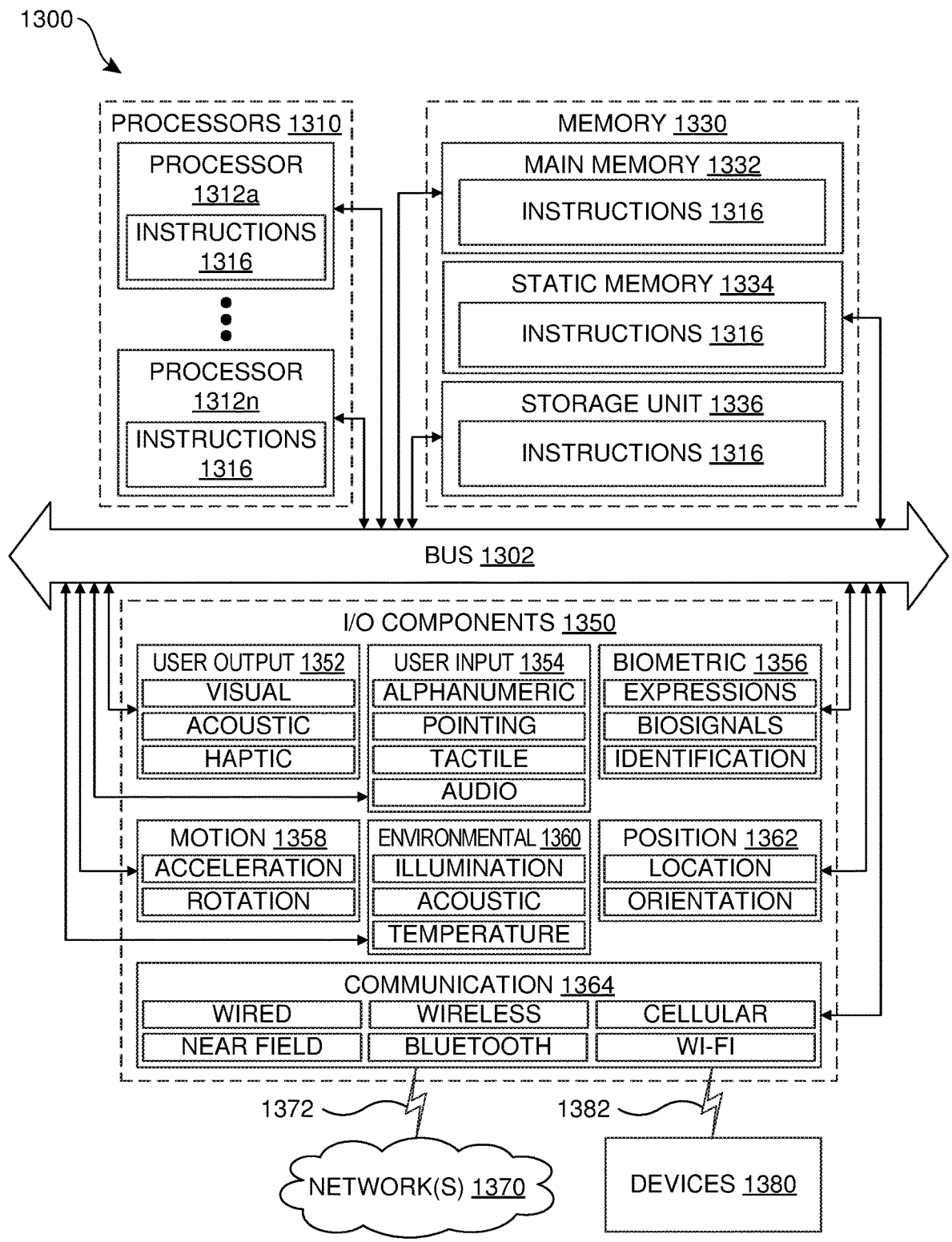
FIG. 13 is a block diagram illustrating components of an example machine configured to read instructions from a machine-readable medium.

FIG. 13 is a block diagram illustrating components of an example machine 1300 configured to read instructions from a machine-readable medium (for example, a machine-readable storage medium) and perform any of the features described herein. The example machine 1300 is in a form of a computer system, within which instructions 1316 (for example, in the form of software components) for causing the machine 1300 to perform any of the features described herein may be executed. As such, the instructions 1316 may be used to implement modules or components described herein. The instructions 1316 cause unprogrammed and/or unconfigured machine 1300 to operate as a particular machine configured to carry out the described features. The machine 1300 may be configured to operate as a standalone device or may be coupled (for example, networked) to other machines. In a networked deployment, the machine 1300 may operate in the capacity of a server machine or a client machine in a server-client network environment, or as a node in a peer-to-peer or distributed network environment. Machine 1300 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1300 is illustrated, the term "machine" includes a collection of machines that individually or jointly execute the instructions 1316.

The machine 1300 may include processors 1310, memory 1330, and I/O components 1350, which may be communicatively coupled via, for example, a bus 1302. The bus 1302 may include multiple buses coupling various elements of machine 1300 via various bus technologies and protocols. In an example, the processors 1310 (including, for example, a central processing unit (CPU), a graphics processing unit (GPU), a digital signal processor (DSP), an ASIC, or a suitable combination thereof) may include one or more processors 1312a to 1312n that may execute the instructions 1316 and process data. In some examples, one or more processors 1310 may execute instructions provided or identified by one or more other processors 1310. The term "processor" includes a multi-core processor including cores that may execute instructions contemporaneously. Although FIG. 13 shows multiple processors, the machine 1300 may include a single processor with a single core, a single processor with multiple cores (for example, a multi-core processor), multiple processors each with a single core, multiple processors each with multiple cores, or any combination thereof. In some examples, the machine 1300 may include multiple processors distributed among multiple machines.

The memory/storage 1330 may include a main memory 1332, a static memory 1334, or other memory, and a storage unit 1336, both accessible to the processors 1310 such as via the bus 1302. The storage unit 1336 and memory 1332, 1334 store instructions 1316 embodying any one or more of the functions described herein. The memory/storage 1330 may also store temporary, intermediate, and/or long-term data for processors 1310. The instructions 1316 may also reside, completely or partially, within the memory 1332, 1334, within the storage unit 1336, within at least one of the processors 1310 (for example, within a command buffer or cache memory), within memory at least one of I/O components 1350, or any suitable combination thereof, during execution thereof. Accordingly, the memory 1332, 1334, the storage unit 1336, memory in processors 1310, and memory in I/O components 1350 are examples of machine-readable media.

As used herein, "machine-readable medium" refers to a device able to temporarily or permanently store instructions and data that cause machine 1300 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1316) for execution by a machine 1300 such that the instructions, when executed by one or more processors 1310 of the machine 1300, cause the machine 1300 to perform and one or more of the features described herein. Accordingly, a "machine-readable medium" may refer to a single storage device, as well as "cloud-based" storage systems or storage networks that include multiple storage apparatus or devices.

The I/O components 1350 may include a wide variety of hardware components adapted to receive input, provide output, produce output, transmit information, exchange information, capture measurements, and so on. The specific I/O components 1350 included in a particular machine will depend on the type and/or function of the machine. For example, mobile devices such as mobile phones may include a touch input device, whereas a headless server or IoT device may not include such a touch input device. The particular examples of I/O components illustrated in FIG. 13 are in no way limiting, and other types of components may be included in machine 1300. The grouping of I/O components 1350 are merely for simplifying this discussion, and the grouping is in no way limiting. In various examples, the I/O components 1350 may include user output components 1352 and user input components 1354. User output components 1352 may include, for example, display components for displaying information (for example, a liquid crystal display (LCD) or a projector), acoustic components (for example, speakers), haptic components (for example, a vibratory motor or force-feedback device), and/or other signal generators. User input components 1354 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1350 may include biometric components 1356 and/or position components 1362, among a wide array of other environmental sensor components. The biometric components 1356 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1362 may include, for example, location sensors (for example, a Global Position System (GPS) receiver), altitude sensors (for example, an air pressure sensor from which altitude may be derived), and/or orientation sensors (for example, magnetometers).

The I/O components 1350 may include communication components 1364, implementing a wide variety of technologies operable to couple the machine 1300 to network(s) 1370 and/or device(s) 1380 via respective communicative couplings 1372 and 1382. The communication components 1364 may include one or more network interface components or other suitable devices to interface with the network(s) 1370. The communication components 1364 may include, for example, components adapted to provide wired communication, wireless communication, cellular communication, Near Field Communication (NFC), Bluetooth communication, Wi-Fi, and/or communication via other modalities. The device(s) 1380 may include other machines or various peripheral devices (for example, coupled via USB).

In some examples, the communication components 1364 may detect identifiers or include components adapted to detect identifiers. For example, the communication components 1364 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1362, such as, but not limited to, geo-location via Internet Protocol (IP) address, location via Wi-Fi, cellular, NFC, Bluetooth, or other wireless station identification and/or signal triangulation.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system comprising:
   at least one processor; and
   one or more computer readable media including instructions which, when executed by the at least one processor, cause the at least one processor to:
      receive, at a first time, a first image corresponding to a first real-world scene;
      receive, at a second time subsequent to the first time, a second image corresponding to a second real-world scene;
      generate a first histogram for the first image by plotting a number of pixels for each of a plurality of tonal values included in the first image;
      generate a second histogram for the second image by plotting the number of pixels for each of the plurality of tonal values included in the second image;
      determine that the first image differs from the second image by at least a first amount by computing a correlation coefficient between the first histogram and the second histogram and determining that the correlation coefficient is lower than a difference threshold which indicates that the first image and the second image differ by at least the first amount;
      receive, at a third time subsequent to the second time, a third image corresponding to a third real-world scene;
      generate a third histogram for the third image by plotting the number of pixels for each of the plurality of tonal values included in the third image;
      determine that the second image differs from the third image by less than the first amount by computing a correlation coefficient between the second histogram and the third histogram and determining that the correlation coefficient is greater than or equal to a difference threshold which indicates that the second image and the third image differ by less than the first amount; and
      automatically capture at least a first region of the third image via a camera optical system in response to determining the second image and third image differ by less than the first amount.

2. The system of claim 1, wherein the instructions further cause the at least one processor to receive a first user input requesting activation of an automatic image capture mode, wherein the automatic capture of at least the first region of the third image is based in part on receiving the first user input.

3. The system of claim 1, wherein the second time and the third time are spaced apart by at least a period of time of approximately 150 ms.

4. A system comprising:
   at least one processor; and
   one or more computer readable media including instructions which, when executed by the at least one processor, cause the at least one processor to:
      receive, at a first time, a first image corresponding to a first real-world scene;
      receive, at a second time subsequent to the first time, a second image corresponding to a second real-world scene;
      generate a first histogram for the first image by plotting a number of pixels for each of a plurality of tonal values included in the first image;
      generate a second histogram for the second image by plotting the number of pixels for each of the plurality of tonal values included in the second image;
      determine that the first image differs from the second image by at least a first amount by comparing the first histogram with the second histogram;
      receive, at a third time subsequent to the second time, a third image corresponding to a third real-world scene;
      generate a third histogram for the third image;
      determine that the second image and the third image differ by less than the first amount by comparing the second histogram with the third histogram;

automatically discard the first histogram in response to determining that the second image and the third image differ by less than by at least the first amount; and automatically capture at least a first region of the third image via a camera optical system in response to determining the second image and third image differ by less than the first amount.

5. The system of claim 4, wherein the first histogram identifies a first number of pixels associated with a first luminance or color value, and the second histogram identifies a second number of pixels associated with the first luminance or color value.

6. The system of claim 4, wherein the instructions further cause the at least one processor to:
generate the third histogram for the third image by plotting the number of pixels for each of a plurality of tonal values included in the third image.

7. The system of claim 6, wherein the instructions further cause the at least one processor to determine that the second image differs from the third image by computing a correlation between the second histogram and the third histogram.

8. The system of claim 4, wherein the instructions further cause the at least one processor to:
store the first histogram and the second histogram;
receive, at a fourth time subsequent to capturing the third image, a fourth image corresponding to a fourth real-world scene;
generate a fourth histogram for the fourth image;
store the fourth histogram;
determine that the third image differs by at least a second amount from the fourth image by comparing the third histogram with the fourth histogram; and
automatically discard the first histogram in response to determining that the third image and the fourth image differ.

9. A method of capturing an image comprising:
receiving, at a first time, a first image corresponding to a first real-world scene;
receiving, at a second time subsequent to the first time, a second image corresponding to a second real-world scene;
generating a first histogram for the first image by plotting a number of pixels for each of a plurality of tonal values included in the first image;
generating a second histogram for the second image by plotting the number of pixels for each of the plurality of tonal values included in the second image;
determining that the first image differs from the second image by at least a first amount by computing a correlation coefficient between the first histogram and the second histogram and determining that the correlation coefficient is lower than a difference threshold which indicates that the first image and the second image differ by at least the first amount;
receiving, at a third time subsequent to the second time, a third image corresponding to a third real-world scene;
generating a third histogram for the third image by plotting the number of pixels for each of the plurality of tonal values included in the third image;
determining that the second image differs from the third image by less than the first amount by computing a correlation coefficient between the second histogram and the third histogram and determining that the correlation coefficient is greater than or equal to a difference threshold which indicates that the second image and the third image differ by less than the first amount; and automatically capturing at least a first region of the third image via a camera optical system in response to determining the second image and third image differ by less than the first amount.

10. The method of claim 9, further comprising receiving a first user input requesting activation of an automatic image capture mode, wherein the automatic capture of at least the first region of the third image is based in part on receiving the first user input.

11. A method of capturing an image, comprising:
receiving, at a first time, a first image corresponding to a first real-world scene;
receiving, at a second time subsequent to the first time, a second image corresponding to a second real-world scene;
generating a first histogram for the first image by plotting a number of pixels for each of a plurality of tonal values included in the first image;
generating a second histogram for the second image by plotting the number of pixels for each of the plurality of tonal values included in the second image;
determining that the first image differs from the second image by at least a first amount by comparing the first histogram with the second histogram;
receiving, at a third time subsequent to the second time, a third image corresponding to a third real-world scene;
generating a third histogram for the third image;
determining that the second image and the third image differ by less than the first amount by comparing the second histogram with the third histogram; and
automatically discarding the first histogram in response to determining that the second image and the third image differ by less than the first amount; and
automatically capturing at least a first region of the third image via a camera optical system in response to determining the second image and third image differ by less than the first amount.

12. The method of claim 11, wherein the first histogram identifies a first number of pixels associated with a first luminance or color value, and the second histogram identifies a second number of pixels associated with the first luminance or color value.

13. The method of claim 11, further comprising:
generating the third histogram for the third image by plotting the number of pixels for each of a plurality of tonal values included in the first image.

14. The method of claim 13, wherein the third histogram identifies a third number of pixels for each of the plurality of tonal values included in the third image, and the method further comprises determining that the second image differs from the third image by computing a correlation between the second histogram and the third histogram.

15. The method of claim 11, further comprising:
storing the first histogram and the second histogram;
receiving, at a fourth time subsequent to capturing the third image, a fourth image corresponding to a fourth real-world scene;
generating a fourth histogram for the fourth image;
storing the fourth histogram;
determining that the third image differs by at least a second amount from the fourth image by comparing the third histogram with the fourth histogram; and automatically discarding the first histogram in response to determining that the third image and the fourth image differ.

16. A system for determining when an automatic image capture should occur, the system comprising:
at least one processor; and
one or more computer readable media including instructions which, when executed by the at least one processor, cause the at least one processor to:
receive, via a camera, a plurality of images frames including a first image frame and a subsequent second image frame;
determine a scene change has occurred between the first image frame and the second image frame by:
generate a first histogram for the first image frame by plotting a number of pixels for each of a plurality of tonal values included in the first image frame;
generate a second histogram for the second image frame by plotting the number of pixels for each of the plurality of tonal values included in the second image frame; and
determining that the first image frame differs from the second image frame by at least a first amount by computing a correlation coefficient between the first histogram and the second histogram and determining that the correlation coefficient is lower than a difference threshold which indicates that the first image frame and the second image frame differ by at least the first amount and that the scene change has occurred;
receive, via the camera, a third image frame subsequent to receiving the second image frame;
generating a third histogram for the third image by plotting the number of pixels for each of the plurality of tonal values included in the third image;
determine a scene stabilization has occurred between the second image frame and the third image frame by computing a correlation coefficient between the second histogram and the third histogram and determining that the correlation coefficient is greater than or equal to a difference threshold which indicates that the second image and the third image differ by less than the first amount and that the scene stabilization has occurred; and
initiate an auto-capture of a fourth image frame received after the third image frame based at least on the determinations that the scene change occurred and the scene stabilization occurred.

* * * * *